(12) United States Patent
Weston et al.

(10) Patent No.: US 8,792,707 B2
(45) Date of Patent: Jul. 29, 2014

(54) PHASE ANALYSIS MEASUREMENT APPARATUS AND METHOD

(75) Inventors: Nicholas John Weston, Peebles (GB); Yvonne Ruth Huddart, Edinburgh (GB); Andrew John Moore, Edinburgh (GB); Timothy Charles Featherstone, Edinburgh (GB)

(73) Assignee: Renishaw PLC, Wotton-Under-Edge (GB)

( * ) Notice: Subject to any disclaimer, the term of this patent is extended or adjusted under 35 U.S.C. 154(b) by 669 days.

(21) Appl. No.: 12/733,022

(22) PCT Filed: Aug. 15, 2008

(86) PCT No.: PCT/GB2008/002759
§ 371 (c)(1), (2), (4) Date: Feb. 3, 2010

(87) PCT Pub. No.: WO2009/024757
PCT Pub. Date: Feb. 26, 2009

(65) Prior Publication Data
US 2010/0158322 A1    Jun. 24, 2010

(30) Foreign Application Priority Data

Aug. 17, 2007 (GB) .................. 0716080.7
Aug. 17, 2007 (GB) .................. 0716088.0
Aug. 17, 2007 (GB) .................. 0716109.4

(51) Int. Cl.
| | |
|---|---|
| G06K 9/00 | (2006.01) |
| G01B 11/00 | (2006.01) |
| G01B 11/02 | (2006.01) |
| G06T 7/00 | (2006.01) |
| G01B 11/25 | (2006.01) |

(52) U.S. Cl.
CPC ............ *G01B 11/007* (2013.01); *G01B 11/026* (2013.01); *G06T 7/0057* (2013.01); *G01B 11/2527* (2013.01)
USPC .......................................... 382/154; 382/141

(58) Field of Classification Search
USPC .......................... 382/113, 141, 154, 195, 216
See application file for complete search history.

(56) References Cited

U.S. PATENT DOCUMENTS

| | | | |
|---|---|---|---|
| 4,767,212 A | 8/1988 | Kitahashi et al. | |
| 5,135,309 A | 8/1992 | Kuchel et al. | |

(Continued)

FOREIGN PATENT DOCUMENTS

| | | |
|---|---|---|
| CN | 1952595 A | 4/2007 |
| CN | 101105393 A | 1/2008 |

(Continued)

OTHER PUBLICATIONS

Scharstein et al. "High-Accuracy Stereo Depth Maps Using Structured Light" Proceedings of the 2003 IEEE Computer Society Conference on Computer Vision and Pattern Recognition (CVPR'03), Jun. 18, 2003.*

(Continued)

*Primary Examiner* — Aaron W Carter
(74) *Attorney, Agent, or Firm* — Oliff PLC

(57) ABSTRACT

A non-contact method and apparatus for inspecting an object via phase analysis. A projector projects an optical pattern onto the surface of an object to be inspected. At least first and second images of the surface on which the optical pattern is projected are then obtained. The phase of the optical pattern at the surface is changed between the first and second image by moving the projector relative to the object.

16 Claims, 13 Drawing Sheets

(56) References Cited

U.S. PATENT DOCUMENTS

| | | | |
|---|---|---|---|
| 5,175,601 A | 12/1992 | Fitts | |
| 5,251,156 A | 10/1993 | Heier et al. | |
| 5,289,264 A * | 2/1994 | Steinbichler | 356/605 |
| 5,319,445 A | 6/1994 | Fitts | |
| 5,372,502 A | 12/1994 | Massen et al. | |
| 5,488,477 A | 1/1996 | De Groot | |
| 5,646,733 A * | 7/1997 | Bieman | 356/604 |
| 5,953,448 A | 9/1999 | Liang | |
| 6,028,672 A | 2/2000 | Geng | |
| 6,055,056 A * | 4/2000 | Kuehmstedt et al. | 356/601 |
| 6,100,984 A | 8/2000 | Chen et al. | |
| 6,144,453 A | 11/2000 | Hallerman et al. | |
| 6,256,099 B1 | 7/2001 | Kaufman et al. | |
| 6,291,817 B1 * | 9/2001 | Kobayashi et al. | 250/237 G |
| 6,421,629 B1 | 7/2002 | Ishiyama | |
| 6,532,299 B1 | 3/2003 | Sachdeva et al. | |
| 6,600,511 B1 * | 7/2003 | Kaneko et al. | 348/231.3 |
| 6,674,893 B1 | 1/2004 | Abe et al. | |
| 6,728,423 B1 | 4/2004 | Rubbert et al. | |
| 6,738,508 B1 | 5/2004 | Rubbert et al. | |
| 6,744,914 B1 | 6/2004 | Rubbert et al. | |
| 6,744,932 B1 | 6/2004 | Rubbert et al. | |
| 6,771,809 B1 | 8/2004 | Rubbert et al. | |
| 7,001,024 B2 | 2/2006 | Kitaguchi et al. | |
| 7,068,836 B1 | 6/2006 | Rubbert et al. | |
| 7,103,211 B1 * | 9/2006 | Medioni et al. | 382/154 |
| 7,133,551 B2 * | 11/2006 | Chen et al. | 382/154 |
| 7,136,170 B2 * | 11/2006 | Notni et al. | 356/601 |
| 7,171,328 B1 | 1/2007 | Walker et al. | |
| 7,256,899 B1 | 8/2007 | Faul et al. | |
| 7,310,514 B2 | 12/2007 | Shinohara | |
| 7,315,643 B2 | 1/2008 | Sakamoto et al. | |
| 7,394,536 B2 | 7/2008 | Sonda et al. | |
| 7,430,312 B2 | 9/2008 | Gu | |
| 7,538,891 B1 * | 5/2009 | Mello et al. | 356/520 |
| 7,684,052 B2 | 3/2010 | Suwa et al. | |
| 7,898,651 B2 | 3/2011 | Hu et al. | |
| 7,912,673 B2 | 3/2011 | Hebert et al. | |
| 7,929,751 B2 | 4/2011 | Zhang et al. | |
| 2002/0057832 A1 | 5/2002 | Proesmans et al. | |
| 2002/0181764 A1 | 12/2002 | Otani et al. | |
| 2003/0123707 A1 | 7/2003 | Park | |
| 2003/0174880 A1 | 9/2003 | Sakamoto et al. | |
| 2004/0246496 A1 | 12/2004 | Yoshida | |
| 2005/0018209 A1 | 1/2005 | Lemelin et al. | |
| 2005/0201611 A1 | 9/2005 | Lloyd, Jr. et al. | |
| 2006/0093206 A1 | 5/2006 | Rubbert et al. | |
| 2006/0103854 A1 | 5/2006 | Franke et al. | |
| 2006/0210146 A1 | 9/2006 | Gu | |
| 2007/0057946 A1 | 3/2007 | Albeck et al. | |
| 2007/0183631 A1 | 8/2007 | Zhang et al. | |
| 2008/0075328 A1 | 3/2008 | Sciammarella | |
| 2010/0046005 A1 | 2/2010 | Kalkowski et al. | |
| 2011/0317879 A1 | 12/2011 | Demopoulos | |
| 2012/0307260 A1 * | 12/2012 | Keshavmurthy et al. | 356/610 |

FOREIGN PATENT DOCUMENTS

| | | |
|---|---|---|
| DE | 38 29 925 A1 | 3/1990 |
| DE | 39 38 714 A1 | 5/1991 |
| DE | 43 01 538 A1 | 7/1994 |
| DE | 196 34 254 A1 | 3/1997 |
| DE | 198 46 145 A1 | 4/2000 |
| EP | 0 445 618 A2 | 9/1991 |
| EP | 0 402 440 B1 | 6/1995 |
| GB | 2 088 095 A | 6/1982 |
| GB | 2 375 392 B | 11/2002 |
| GB | 2 434 541 A1 | 8/2007 |
| JP | A-61-114109 | 5/1986 |
| JP | A-07-260451 | 10/1995 |
| JP | A-11-211442 | 8/1999 |
| JP | A-11-211443 | 8/1999 |
| JP | A-2000-097672 | 4/2000 |
| JP | A-2001-012925 | 1/2001 |
| JP | A-2001-108422 | 4/2001 |
| JP | A-2002-54912 | 2/2002 |
| JP | A-2002-90126 | 3/2002 |
| JP | A-2002-162215 | 6/2002 |
| JP | A-2003-269928 | 9/2003 |
| JP | A-2003-527582 | 9/2003 |
| JP | A-2004-317495 | 11/2004 |
| JP | A-2005-345383 | 12/2005 |
| JP | A-2006-179031 | 7/2006 |
| JP | A-2007-024764 | 2/2007 |
| JP | A-2007-093412 | 4/2007 |
| JP | A-2007-121294 | 5/2007 |
| WO | WO 91/15732 | 10/1991 |
| WO | WO 97/05449 A1 | 2/1997 |
| WO | WO 97/36144 | 10/1997 |
| WO | WO 00/21034 A1 | 4/2000 |
| WO | WO 01/51887 A1 | 7/2001 |
| WO | WO 2004/083778 A1 | 9/2004 |
| WO | WO 2004/096502 A1 | 11/2004 |
| WO | WO 2005/059470 A1 | 6/2005 |
| WO | WO 2005/073669 A1 | 8/2005 |
| WO | WO 2007/121953 A1 | 11/2007 |
| WO | WO 2007/125081 A1 | 11/2007 |
| WO | WO 2008/046663 A2 | 4/2008 |
| WO | WO 2009/024756 A1 | 2/2009 |
| WO | WO 2009/024757 A1 | 2/2009 |
| WO | WO 2009/024758 A1 | 2/2009 |
| WO | WO 2009/094510 A1 | 7/2009 |
| WO | WO 2009/097066 A1 | 8/2009 |

OTHER PUBLICATIONS

Kemper et al, "Quantitative determination of out-of-plane displacements by endoscopic electronic-speckle-pattern interferometry" Optics Communication 194 (2001), pp. 75-82, Jul. 1, 2001.*

English translation of Jun. 15, 2011 Office Action issued in Chinese Patent Application No. 200880111247.3.

Marapane, "Region-Based Stereo Analysis for Robotic Applications", IEEE, 1989, pp. 307-324.

Takasaki, "MOIRE Topography", Applied Optics, Jun. 1970, vol. 9, No. 6, pp. 1467-1472.

Takeda et al, "Fourier-transform method of fringe-pattern analysis for computer-based topography and interferometry", Optical Society of America, Jan. 1982, vol. 72, No. 1, pp. 156-160.

Geometrical Product Specifications (GPS)—Geometrical Features, British Standard, BS EN ISO 1466-1:2000.

Jan. 30, 2012 Office Action issued in European Application No. 08 788 327.8.

Jan. 30, 2012 Office Action issued in European Application No. 08 788 329.4.

Jan. 6, 2012 Second Office Action issued in Chinese Patent Application No. 200880111248.8 (translation only).

Sep. 29, 2009 Search Report issued in Great Britain Application No. GB0915904.7.

Dec. 21, 2010 International Search Report issued in International Application No. PCT/GB2010/0001675.

Dec. 21, 2010 Written Opinion of the International Searching Authority issued in International Application No. PCT/GB2010/0001675.

U.S. Appl. No. 13/392,710, filed on Feb. 27, 2012 in the name of Weston et al.

Apr. 26, 2012 Office Action issued in European Patent Application No. 08 788 328.6.

Heikkilä et al., "A Four-step Camera Calibration Procedure with Implicit Image Correction," 1997, Proceedings of the 1997 Conference in Computer Vision and Pattern Recognition.

Fryer, "Camera Calibration," *Close Range Photogrammetry and Machine Vision*, 1996, pp. 156-179, Whittles Publishing.

Creath, "Comparison of Phase-Measurement Algorithms," *Surface Characterization and Testing*, 1986, pp. 19-28, SPIE, vol. 680.

Carré, "Installation et utilisation du comparateur photoélectrique et interférential du Bureau International des Poids et Mesures," 1966, *Metrologia*, pp. 13-23, vol. 2, No. 1, France (with abstract).

Stoilov et al., "Phase-stepping Interferometry, Five-frame Algorithm with an Arbitrary Step," *Optics and Lasers in Engineering*, 1997, pp. 61-69, vol. 28.

(56) References Cited

OTHER PUBLICATIONS

Parker, "Advanced-Edge Detection Techniques: The Canny and the Shen-Castan Methods," 1997, pp. 1-33, John Wiley & Sons, Inc.
Gruen, "Least squares matching: a fundamental measurement algorithm," *Close Range Photogrammetry and Machine Vision*, 2001, pp. 217-255, Whittles Publishing.
Cooper at al., "Theory of close range photogrammetry," *Close Range Photogrammeny and Machine Vision*, 2001, pp. 9-51, Whittles Publishing.
Korner et al., Absolute macroscopic 3-D measurements with the innovative depth-scanning fringe projection technique (DSFP), *Optik International Journal for Light and Electron Optics*, 2001, pp. 433-441, vol. 112, No. 9.
Scharstein et al., "High-Accuracy Stereo Depth Maps Using Structured Light," Proc. 2003 IEEE Computer Society Conference on Computer Vision and Pattern Recognition, 2003, pp. 195-202, vol. 1, Computer Society.
Reich et al., "3-D shape measurement of complex objects by combining photogrammetry and fringe projection," *Optical Engineering*, 2000, pp. 224-231, vol. 39, No. 1, Society of Photo-Optical Instrumentation Engineers.
Ishiyama et al., "Precise 3-D Measurement Using Uncalibrated Pattern Projection," *IEEE International Conference on Image Processing*, 2007, pp. 225-228.
Kühmstedt et al., "3D shape measurement with phase correlation based fringe projection," *Optical Measurement Systems for Industrial Inspection V*, 2007, pp. 1-9, vol. 6616, Proc. of SPIE.
Schreiber et al., "Managing some calibration problems in fringe projection shape measurement systems," *Measurement Systems for Optical Methodology*, 1997, pp. 443-450, Fringe.
Schreiber et al., "Theory and arrangements of self-calibrating whole-body three-dimensional measurement systems using fringe projection technique," *Optical* Engineering, 2000, pp. 159-169, vol. 39, No. 1, Society of Photo-Optical Instrumentation Engineers.
Chen et al., "Range data acquisition using color structured lighting and stereo vision," *Image and Vision Computing*, 1997, pp. 445-456, vol. 15, Elsevier.
Kim et al., "An active trinocular vision system of sensing indoor navigation environment for mobile robots," *Sensors and Actuators A*, Sep. 2005, pp. 192-209, vol. 125, Elsevier.
Wong et al., "Fast acquisition of dense depth data by a new structured light scheme," *Computer Vision and Image Understanding*, Dec. 2004, pp. 398-422, vol. 98, Elsevier.
"3D Coordinate Measurement—Milling on digitized data; Casted Blanks," www.gom.com, obtained Aug. 7, 2007, GOM mbH.
"Measuring Systems—TRITOP," http://www.gom.com/EN/measuring.systems/tritop/system/system.html, obtained Aug. 7, 2007, GOM mbH.
Clarke, "Non-contact measurement provides six of the best," *Quality Today*, 1998, pp. s46, s48.
Coggrave, "Wholefield Optical Metrology: Surface Profile Measurement," 2002-2004, pp. 1-35, Phase Vision Ltd.
Chen et al., "Overview of three-dimensional shape measurement using optical methods," *Opt. Eng.*, 2000, pp. 10-22, Society of Photo-Optical Instrumentation Engineers.
Sansoni et al., "Three-dimensional vision based on a combination of gray-code and phase-shift light projection: analysis and compensation of the sytematic errors," *Applied Optics*, 1999, pp. 6565-6573, vol. 38, No. 31, Optical Society of America.
Leymarie, "Theory of Close Range Photogrammetry," http://www.lems.brown.edu/vision/people/leymarie/Refs/Photogrammetry/Atkinson90/Ch2Theory.html, May 10, 2010 update, Ch. 2 of [Atkinson 90], obtained Mar. 31, 2010.
"Measuring Systems—ATOS," http://www.gom.com/EN/measuring,systems/atos/system/system.html, obtained Oct. 6, 2008, GOM mbH.
"3D-Digitizing of a Ford Focus—Interior/Exterior—Product Analysis," www.gom.com, obtained Oct. 6, 2008, GOM mbH.
"optoTOP-HE—The HighEnd 3D Digitising System," http://www.breuckmann.com/index.php?id=optotop-he&L=2, obtained Oct. 6, 2008, Breuckmann.
Galanulis et al., "Optical Digitizing by ATOS for Press Parts and Tools," www.gom.com, Feb. 2004, GOM mbH.
Nov. 18, 2008 International Search Report issued in International Patent Application No. PCT/GB2008/002759.
Nov. 18, 2008 Written Opinion issued in International Patent Application No. PCT/GB2008/002759.
Nov. 18, 7008 International Search Report issued in International Patent Application No. PCT/GB2008/002760.
Nov. 18, 2008 Written Opinion issued in international Patent Application No. PCT/GB2008/002760.
Nov. 18, 2008 International Search Report issued in International Patent Application No. PCT/GB2008/002758.
Nov. 18, 2008 Written Opinion issued in International Patent Application No. PCT/GB2008/002758.
U.S. Appl. No. 12/733,021, filed Feb. 3, 2010 in the name of Weston at al.
U.S. Appl. No. 12/733,025, filed Feb. 3, 2010 in the name of Weston et al.
Hailong, J. et al., "Shape reconstruction methods from gradient field," *Laser Journal*, 2007, pp. 41-43, vol. 28, No. 6 (with Abstract).
Chinese Office Action issued in Chinese Application No. 200880111248.8 on Mar. 9, 2011 (translation only).
May 3, 2012 Chinese Office Action issued in Chinese Patent Application No. 200880112194.7 (with translation).
Apr. 23, 2012 Chinese Office Action issued in Chinese Patent Application No. 200880111248.8 (with translation).
May 3, 2012 Office Action issued in Chinese Patent Application No. 200880111247.3 (with translation).
Jun. 15, 2011 Office Action issued in Chinese Patent Application No. 200880112194.7.
Tsai, R. et al., "A New Technique for Fully Autonomous and Efficient 3D Robotics Hand/Eye Calibration," *IEEE Transactions on Robotics and Automation*, Jun. 1989, pp. 345-358, vol. 5, No. 3.
Sep. 19, 2012 Office Action issued in U.S. Appl. No. 12/733,021.
Nov. 16, 2012 Office Action issued in Japanese Patent Application No. 2010-521467 (with Translation).
Reeves et al., "Dynamic shape measurement system for laser materials processing," Optical Engineering 42 (10), pp. 2923-2929 (2003).
Huntley et al., "Shape measurement by temporal phase unwrapping: comparison of unwrapping algorithms," Measurement Science and Technology 8, pp. 986-992 (1997).
Brauer-Burchardt et al., "Phase unwrapping in fringe projection systems using epipolar geometry," LNCS 5259, pp. 422-432 (2008).
Ishiyama et al., "Absolute phase measurements using geometric constraints between multiple cameras and projectors," Applied Optics 46 (17), pp. 3528-3538 (2007).
Sasso et al., "Superimposed fringe projection for three-dimensional shape acquisition by image analysis," Applied Optics 48 (13), pp. 2410-2420 (2009).
Patil et al., "Guest editorial. Moving ahead with phase," Optics and Lasers in Engineering 45, pp. 253-257 (2007).
Takeda et al., "Fourier transform profilometry for the automatic measurement of 3-D object shapes," Applied Optics 22 (24), pp. 3977-3982 (1983).
Kowarschik et al., "Adaptive optical three-dimensional measurement with structured light," Optical Engineering 39 (1), pp. 150-158 (2000).
Aug. 21, 2012 Office Action issued in U.S. Appl. No. 12/733,025.
Cuypers, W., et al., "Optical measurement techniques for mobile and large-scale dimensional metrology," *Optics and Lasers in Engineering*, 47, (2009), pp. 292-300.
"Picture Perfect Measurements, Do I need to use special targets with the system?," 1 page, Geodetic Systems Inc., downloaded Sep. 6, 2012 from http://www.geodetic.com/do-i-need-to-use-special-targets-with-the-system.aspx.
"Application Notes—TRITOP," 1 page, GOM Optical Measuring Techniques, downloaded Sep. 6, 2012 from http://www.gom.com/industries/application-notes-tritop.html.

(56) References Cited

OTHER PUBLICATIONS

"Picture Perfect Measurements, The Basics of Photogrammetry," 14 pages, Geodetic Systems Inc., downloaded Sep. 6, 2012 from http://www.geodetic.com/v-stars/what-is-photogrammetry.aspx.

"Application Example: 3D-Coordinate Measurement Mobile 3D Coordinate Measurement for Shipbuilding," 6 pages, GOM Optical Measuring Techniques, downloaded Sep. 6, 2012 from http://www.gom.com/fileadmin/user_upload/industries/shipbuilding_EN.pdf.

Wallace, Iain et al., "High-speed photogrammetry system for measuring the kinematics of insect wings," *Applied Optics*, vol. 45, No. 17, Jun. 10, 2006, pp. 4165-4173.

Sep. 21, 2012 Office Action issued in Japanese Patent Application No. 2010-521465 (with English Translation).

Nov. 16, 2012 Office Action issued in Japanese Patent Application No. 2010-521466 (with English Translation).

Feb. 7, 2013 Office Action issued in U.S. Appl. No. 12/733,021.

Feb. 6, 2013 Office Action issued in U.S. Appl. No. 12/733,025.

Translation of JP-A-2007-24764 originally cited in an Information Disclosure Statement filed on Nov. 20, 2012.

Feb. 16, 2013 Office Action issued in Chinese Application No. 200880111247.3 (with English translation).

Feb. 16, 2013 Office Action issued in Chinese Application No. 200880112194.7 (with English translation).

English-language translation of JP-A-2007-93412 published Apr. 12, 2007.

English-language translation of JP-A-11-211442 published Aug. 6, 1999.

Sep. 11, 2013 Office Action issued in U.S. Appl. No. 12/733,025.

Aug. 16, 2013 Office Action issued in Japanese Patent Application No. 2010-521465 w/translation.

Aug. 9, 2013 Office Action issued in Japanese Patent Application No. 2010-521466 w/translation.

Aug. 9, 2013 Office Action issued in Japanese Patent Application No. 2010-521467 w/translation.

Dec. 2, 2013 Chinese Office Action issued in Chinese Patent Application No. 201080040329.0 (with English-language translation).

Japanese Office Action issued in Japanese Patent Application No. 2012-528441 dated Jan. 28, 2014 (w/ translation).

European Office Action issued in European Patent Application No. 08 788 328.6 dated Feb. 27, 2014.

Wolfson, Wendy and Gordon, Stephen J., "Three-Dimensional Vision Technology Offers Real-Time Inspection Capability," Sensor Review, 1997, pp. 299-202, vol., 17, No. 4. MCB University Press.

Feb. 28, 2014 Notice of Allowance issued in U.S. Appl. No. 12/733,025.

Feb. 25, 2014 Office Action issued in Japanese Patent Application No. 2010-521467 (with English translation).

Notice of Allowance issued in U.S. Patent Application No. 12/733,021 dated Sep. 3, 2013.

Translation of CN 101105393, previously submitted on Jan. 30, 2014.

\* cited by examiner

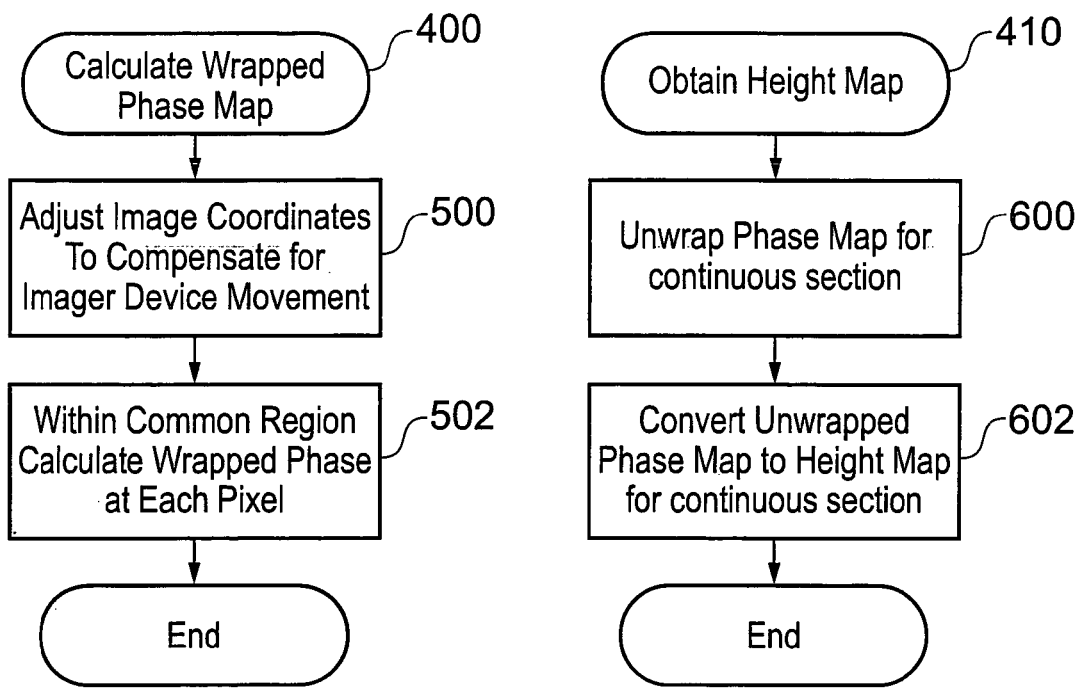
FIG. 8
FIG. 9
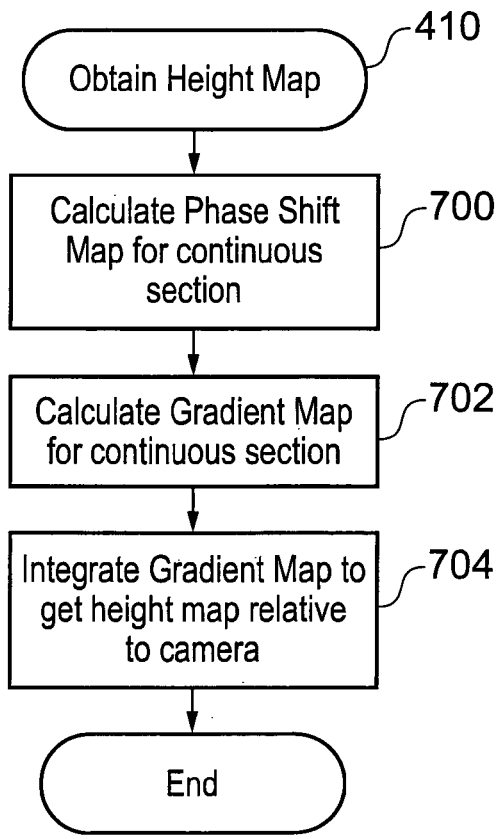
FIG. 10

PHASE ANALYSIS MEASUREMENT APPARATUS AND METHOD

This invention relates to a method and apparatus for measuring an object without contacting the object and in particular to a method and apparatus in which an object's surface topography can be determined by analysing the phase of an optical pattern projected on an object.

Non-contact optical measuring systems are known for measuring the topography of a surface via phase analysis of a periodic optical pattern on an object. These may typically consist of a projector which projects a structured light pattern onto a surface and a camera, set at an angle to the projector, which detects the structured light pattern on the surface. Height variation on the surface causes a distortion in the pattern. From this distortion the geometry of the surface can be calculated. Such systems are commonly known as structured light analysis, phase profilometry, phase-shift analysis or fringe analysis systems.

U.S. Pat. No. 6,100,984 discloses a projector for use in such a system. A laser beam is incident on a lens which diverges the beam on to a liquid crystal system to generate at least one fringe pattern on the surface to be measured. A computer is used to control the pitch and phase of the fringe pattern generated by the liquid crystal system. Photographic equipment is positioned to take an image of the fringe pattern on the surface. The computer and the liquid crystal system then perform a phase-shifting technique and another picture is taken of the new image. Using these two images it is possible to obtain an accurate map of the topography of the surface. The use of a liquid crystal system requires complex interfacing resulting in relatively high power consumption and subsequent heat generation. Such a system can be expensive.

WO 0151887 also discloses a structured light analysis system which has a fringe projector comprising an internal refractor which can be manipulated to change the position of the projected fringe on the object and hence the phase of the fringe at the object's surface, and also discloses moving the object to reposition the fringe on the object.

The invention describes a method of phase shifting an optical pattern projected on an object to be inspected by phase analysis, in which the phase is shifted by moving the optical pattern source relative to the object.

A non-contact method for inspecting an object via phase analysis, comprising: i) a projector projecting an optical pattern onto the surface of an object to be inspected; ii) obtaining at least first and second images of the surface on which the optical pattern is projected, in which the phase of the optical pattern at the surface is changed between the first and second image by moving the projector relative to the object.

It is an advantage of the present invention that the phase of the optical pattern at the object can be displaced by moving the projector. In certain circumstances this can avoid the need for expensive and/or complex equipment to be provided in the projector in order to obtain a change in position of the optical pattern on the object. For example, it could be possible to provide the projector without any internal moving parts. As the projector is moved, large and/or heavy objects can be easily measured. Furthermore it can allow the in-situ measurement of an object during machining so that re-datuming in order to continue machining is not required. As will be understood, the optical pattern as projected by the projector could be the same for the at least first and second phase-shifted images.

Preferably, the optical pattern extends in two dimensions. This enables the determination of the topology of the surface of an object in two dimensions from a single image of the optical pattern on the object. The optical pattern can be a substantially full-field optical pattern. A substantially full-field optical pattern can be one in which the pattern extends over at least 50% of the field of view of an imaging device for obtaining at least one of the at least first and second images, at a reference plane (described in more detail below), more preferably over at least 75%, especially preferably over at least 95%, for example substantially over the entire field of view of the imaging device at a reference plane. The reference plane can be a plane that is a known distance away from the imaging device. Optionally, the reference plane can be a plane which contains the point at which the projector's and imaging device's optical axes intersect. The reference plane can extend perpendicular to the imaging device's optical axis.

Preferably the optical pattern is a substantially periodic optical pattern. As will be understood, a periodic optical pattern can be a pattern which repeats after a certain finite distance. The minimum distance between repetitions can be the period of the pattern. Preferably the optical pattern is periodic in at least one dimension. Optionally, the optical pattern can be periodic in at least two dimensions. The at least two dimensions can be perpendicular to each other.

Preferably the optical pattern as imaged in the at least first and second images is projected over an area of the object. Preferably the pattern extends over an area of the object so as to facilitate the measurement of a plurality of points of the object over the area using the method of the present invention.

Suitable optical patterns for use with the present invention include patterns of concentric circles, patterns of lines of varying colour, shades, and/or tones. The colour, shades and/or tones could alternate between two or more different values. Optionally, the colour, shade and/or tones could vary between a plurality of discrete values. Preferably, the colour, shade and/or tones varies continuously across the optical pattern. Preferably, the periodic optical pattern is a fringe pattern. For example, the periodic optical pattern is a set of sinusoidal fringes. In this case, the method will comprise obtaining a plurality of fringe-shifted images.

The optical pattern can be in the infrared to ultraviolet range. Preferably, the optical pattern is a visible optical pattern. As will be understood, an optical pattern for use in methods such as that of the present invention are also commonly referred to as a structured light pattern.

Suitable projectors for the optical pattern include a digital light projector configured to project an image input from a processor device. Such a projector enables the pattern projected to be changed. Suitable projectors could comprise a light source and one or more diffraction gratings arranged to produce the optical pattern. The diffraction gating(s) could be moveable so as to enable the pattern projected by the projector to be changed. For instance, the diffraction grating(s) can be mounted on a piezoelectric transducer. Optionally, the diffraction gratings could be fixed such that the optical pattern projected by the projector cannot be changed. Optionally the projector could comprise a light source and a hologram. Further, the projector could comprise a light source and a patterned slide. Further still, the projector could comprise two mutually coherent light sources. The coherent light sources could be moveable so as to enable the pattern projected by the projector to be changed. For instance, the coherent light sources can be mounted on a piezoelectric transducer. Optionally, the coherent light sources could be fixed such that the optical pattern projected by the projector cannot be changed.

The method can comprise obtaining at least a third phase-shifted image of the optical pattern on the surface. The more images obtained then the more images that are available for analysis in order to calculate the topographical data. This accuracy and reliability of the topographical data can increase with the number of images obtained.

The projector can be moved by any amount which provides a change in the position of the projected optical pattern relative to the object. Preferably the projector is moved such that the position of the pattern on the object is at least nominally moved by a non-integral multiple of the period of the pattern. For instance, when the optical pattern is a fringe pattern, the projector can be moved such that the position of the pattern on the object is at least nominally moved by a non-integral multiple of the fringe period. For example, the projector can be moved such that the position of the pattern on the object is at least nominally moved by a ¼ of the fringe period. As will be understood, the actual distance the projector is to be moved relative to obtain such a shift in the pattern on the object can depend on a number of factors including the period of the periodic optical pattern projected and the distance between the object and the projector.

As will be understood, moving the projector will cause a change in the position of the optical pattern on the object. However, it may appear from images of the optical pattern on the object taken before and after the movement that the optical pattern has not moved. This can be referred to as nominal movement. Whether or not the movement is nominal or actual will depend on a number of factors including the form of the optical pattern projected, and the shape and/or orientation of the surface of the object relative to the projector. For instance, the change in position of the optical pattern on a surface for a given movement will be different for differently shaped and oriented surfaces. It might be that due to the shape and/or orientation of the surface that it would appear that the optical pattern has not changed position, when it fact it has moved and that that movement would have been apparent on a differently shaped or positioned object. What is important is that it is known that the movement is such that it would cause a change in the position of the optical pattern on a reference surface of a known shape and orientation relative to the projector. Accordingly, it is possible to determine the shape and orientation of the surface by effectively determining how the position of the optical pattern as imaged differs from the known reference.

The projector could be moved such that the position of the optical pattern relative to a predetermined reference plane in the measurement space is changed. The projector could be moved such that the position of the optical pattern relative to a predetermined reference plane in the measurement space is changed by a non-integral multiple of the period of the pattern. The predetermined reference plane could be the reference plane of the image sensor. Again, the shape and/or orientation of the surface of the object can then be determined by effectively comparing the position of the optical pattern on the surface relative to what it would be like at the reference plane.

The at least first and second images can be obtained by at least one suitable imaging device. Suitable imaging devices can comprise at least one image sensor. For example, suitable imaging devices can comprise an optical electromagnetic radiation (EMR) sensitive detector, such as a charge-coupled device (CCD), a complementary metal-oxide-semiconductor (CMOS). Suitable imaging devices can be optically configured to focus light at the image plane. As will be understood, the image plane can be defined by the image sensor. For example, suitable imaging devices can comprise at least one optical component configured to focus optical EMR at the image plane. Optionally, the at least one optical component comprises a lens.

Suitable imaging devices can be based on the pinhole camera model which consists of a pinhole, which can also be referred to as the imaging device's perspective centre, through which optical EMR rays are assumed to pass before intersecting with the image plane. As will be understood, imaging devices that do not comprise a pinhole but instead comprise a lens to focus optical EMR also have a perspective centre and this can be the point through which all optical EMR rays that intersect with the image plane are assumed to pass.

As will be understood, the perspective centre can be found relative to the image sensor using a calibration procedure, such as those described in J. Heikkila and O. Silven, "A four-step camera calibration procedure with implicit image correction", Proceedings of the 1997 Conference in Computer Vision and Pattern Recognition (CVPR '97) and J. G Fryer, "Camera Calibration" in K. B. Atkinson (ed.) "Close range photogrammetry and machine vision", Whittles publishing (1996). Correction parameters such as those for correcting lens aberrations can be provided and are well known and are for instance described in these two documents.

The at least first and second images can be obtained by an imaging device unit comprising at least one imaging device. The imaging device unit could comprise a single imaging device. The at least one first and at least one second images can be obtained by a single imaging device. The single imaging device can comprise a single image sensor. Accordingly, the first and second images can be obtained by a single image sensor.

Step ii) can comprise moving the projector and imaging device relative to the object. This is especially the case when the imaging device and the projector are in a fixed spatial relationship relative to each other. This might be the case, for instance, when the imaging device and projector are provided as a single unit. For example, the imaging device and projector could be provided as a single probe device.

When the object and imaging device are moved relative to each other, then the amount of relative movement should be sufficiently small such that the perspective of the object obtained by the imaging device in each of the images is substantially the same. In particular, preferably the movement is sufficiently small such that the images image substantially the same points on the object. For instance, the images obtained in step ii) can overlap by at least 50%, preferably by at least 75%, more preferably by at least 90%, especially preferably by at least 95%, for example by at least 97%. It can be preferred that the movement is sufficiently small such that the perspective of the object obtained by the image sensor in each of the images is substantially the same such that that any change in the perspective between the plurality of images can be compensated for in the step of analysing the plurality images (described in more detail below).

As will be understood, a perspective can be a particular view point of the object.

A perspective can be defined by the position and/or orientation of the image sensor relative to the object.

The projector could be laterally displaced relative to the object in order to displace the optical pattern on the surface. Optionally, the projector is rotated relative to the object. In a preferred embodiment, the projector and imaging device are moved between images by rotating the projector and imaging device about the imaging device's perspective centre. It has been found that rotating about the imaging device's perspective centre makes it easier to process the images to compensate for any relative movement between the object and imaging device (discussed in more detail below). In particular it makes matching corresponding pixels across a number of images easier. For instance, matching corresponding pixels is possible using a coordinate transformation which is independent of the distance between the object and the imaging device. Accordingly, it is not necessary to know the distance between the object and imaging device in order to process the images to compensate for any relative movement between the object and imaging device.

Optionally, the method further comprises processing the phase-shifted images to obtain topographical surface data. Accordingly, the method can be used to obtain topographical data regarding a surface of the object. As will be understood, the object can be unknown. That is the object can be of unknown dimensions. As will be understood, the processing can be performed by a processor device that is separate to the device controlling the projector and/or imaging device.

The method can comprise determine topographical data across the entire of one of the first and second images. Optionally, the method can comprise determining the topographical data across only a part of one of the first and second images. In particular, the method comprises determining topographical data for a continuous section of the object on which the optical pattern is projected. A continuous section of the object can be a part of the object which is enclosed by a plurality of irregularities or discontinuities in the optical pattern as described in more detail below.

As will be understood, topographical surface data can be data indicating the topography of at least a part of the object's surface. The topographical data can be data indicating the height of the object's surface relative to the imaging device, at at least one point on the object, and preferably at a plurality of points on the object. The topographical data can be data indicating the gradient of the object's surface, at at least one point on the object, and preferably at a plurality of points on the object.

As will be understood, topographical data can be determined by effectively analysing the phase of the optical pattern on the surface. There are many known techniques for determining topographical data from a set of phase-shifted images and are often referred to as phase stepping algorithms. For instance suitable phase stepping algorithms are described in Creath, K. "Comparison of phase measurement algorithms" Proc. SPIE 680, 19-28 (1986).

Known phase-stepping algorithms can require that the corresponding points on the image correspond to the same point on an object. As will be understood, this will not be the case in embodiments in which the imaging device moves relative to the object. Accordingly, the method can comprise processing the at least first and second images to compensate for any relative movement between the object and imaging device. Once compensated, corresponding points on the plurality of images should represent the same point on the object. Processing the images can comprise identifying common image areas covered by the at least first and second images. Processing the images can comprise adjusting the image coordinates of at least one of the first and second images. Processing the images can comprise applying a coordinate transformation to at least one of the first and second images. The coordinate transformation can be a linear translation. This can have the effect of cropping the images. Optionally, the coordinate transformation can be a non-linear function that may depend on the camera internal parameters (including lens aberrations), the image coordinates of the points being transformed, the relative motion of the object and sensing device, the distance to the object and other system parameters. As will be understood, the most appropriate coordinate transformation will be the one that most accurately makes the position of an object in the transformed images invariant under the relative motion of object and imaging device.

However, it has been found that it is possible to process the at least first and second images to obtain topographical surface data without compensating for any relative movement between the object and the imaging device between the at least first and second images. This has been found advantageous as it enables the method to be performed even in situations in which the relative motion of the imaging device and the object may not be accurately compensated for. For instance, if the imaging device has been moved laterally and the standoff distance is not large compared to the depth of the measurement volume. For instance, the at least first and second images can be obtained in situations in which the ratio of the depth of field to standoff is less than 10:1, for example less than 5:1, for instance 1:1. Accordingly, it is possible that step iii) involves processing at least first and second images in which the corresponding points on the at least first and second images represent different points on the object. This can be achieved, for instance, by effectively analysing the change in phase of the optical pattern across corresponding points on the at least first and second images. In other words, this can be achieved, by effectively analysing the change in phase of the optical pattern across the same pixels on the at least first and second images. Suitable algorithms for processing the at least first and second images which have not been processed to compensate for relative movement include Carré algorithms which are well known and for example described in Carre, P. "Installation et utilisation du comparateur photoelectrique et interferential du Bureau International des Podis et Mesure" Metrologia 2 13-23 (1996), and also 5-frame algorithms as described in G. Stoilov, T. Dragostinov, "Phase-stepping interferometry: five-frame algorithm with an arbitrary step", Opitcs and Lasers in Engineering 28, 61-69 (1997). As will be understood, processing phase-shifted images using a Carré algorithm provides modulation amplitude and phase-shift data as well as phase data.

Processing the at least first and second images can comprise calculating a phase map from the at least first and second images. As will be understood, a phase map is a map which contains the phase of a pattern projected onto the object's surface for a plurality of pixels in an image. In particular, this can comprise calculating a wrapped phase map from the at least first and second images. Accordingly, step iii) can comprise calculating a wrapped phase map using a phase stepping algorithm. Step iii) can further comprise unwrapping the wrapped phase map and obtaining the topographical data from the unwrapped phase map. The topographical data could be in the form of height data. As will be understood, height data can detail the position of a plurality of points on the surface relative to the imaging device.

As will be understood, when the object and imaging device are moved together relative to each other, then step iii) can comprise: a) processing at least one of the first and second images to compensate for movement between the object and imaging device; b) calculating an (e.g. wrapped) phase map using the compensated images. Step iii) can further comprise c) unwrapping a wrapped phase map and obtaining a topographical data regarding the surface of the object.

Accordingly, step a) can comprise identifying common image areas covered by the plurality of images and step b) can comprise calculating a phase map using the common image areas only. In particular step a) can comprise adjusting the image coordinates to compensate for relative movement between the object and the imaging device.

Analysing the at least first and second image can comprise determining the gradient of the surface. This can be the gradient relative to the imaging device. Determining the gradient of the surface can comprise calculating a phase shift map from the plurality of images. There are many suitable algorithms for generating a phase shift map from the plurality of images. For example, a Carré algorithm can be used to generate the phase shift map. Determining the gradient of the surface relative can further obtaining a gradient map based on the phase shift map. The gradient map can be obtained by converting the value of each of the points on a phase shift map to a gradient value. The value of a point in a phase shift map can be converted to a gradient value using a predetermined mapping procedure. As will be understood, a phase shift map can detail the phase shift for a plurality of points on the surface due to the change in position of projected fringes on the object's surface. The phase shift can be bound in a range of 360 degrees. A gradient map can detail the surface gradient of a plurality of points on the surface.

The method can further comprise integrating the gradient map to obtain height data. As explained above, height data can detail the position of a plurality of points on the surface relative to the imaging device.

The projector and the imaging device can be mounted on a coordinate positioning apparatus. This enables accurate position information regarding the location and/or orientation of the projector and imaging device to be obtained.

The object can be located in a measurement space and the method can further comprise determining the three-dimensional coordinates of the topographical data within the measurement space.

As mentioned above, preferably the at least first and second images are obtained from a same first perspective. Accordingly, the method comprises obtaining a first set of a plurality of images. The method can further comprise the imaging device obtaining at least a second set of a plurality of images of the object from at least a second perspective that is different to the first perspective. The method can then further comprise identifying at least one target feature on the object to be measured from the first and at least second sets of a plurality of images, and then determining the position of the target feature on the object relative to the imaging device. Details of a method and apparatus for identifying topographical data of a surface of an object as well as identifying and determining the position of target features on an object are disclosed in the co-pending PCT application filed on the same day as the present application with the title NON-CONTACT PROBE and having the applicant's reference number 743/WO/0 and claiming priority from UK Patent Application nos. 0716080.7, 0716088.0, 0716109.4. Subject matter that is disclosed in that application is incorporated in the specification of the present application by this reference.

A target feature can be a predetermined mark on the object. The predetermined mark could be a part of the object, for example a predetermined pattern formed on the object's surface. Optionally, the mark could be attached to the object for the purpose of identifying a target feature. For example, the mark could be a coded "bull's eye", wherein the "bull's-eye" has a unique central point which is invariant with perspective, surrounded by a set of concentric black and white rings which code a unique identifier. Automatic feature recognition methods can be used to both locate the centre of the target and also decode the unique identifier. By means of such targets the images can be automatically analysed and the coordinates of the "bull's-eye" centre returned.

A target feature on the object to be measured can be identified by feature recognition techniques. For example, a Hough Transform can be used to identify a straight line feature on the object.

Preferably, the image analyser is configured to identify at least one irregularity in the optical pattern as imaged in the at least one first and second images as the at least one target feature. This is advantageous as target features can be identified without the use of markers placed on the object. This has been found to enable highly accurate measurements of the object to be taken quickly. It has also been found that the method of the invention can require less processing resources to identify points on complex shaped objects than by other known image processing techniques. Details of a method of identifying an irregularity in an optical pattern in each of at least one first and second images as a target feature are disclosed in the co-pending PCT application filed on the same day as the present application with the title NON-CONTACT MEASUREMENT APPARATUS AND METHOD and having the applicant's reference number 741/WO/0 and claiming priority from UK Patent Application nos. 0716080.7, 0716088.0, 0716109.4. Subject matter that is disclosed in that application is incorporated in the specification of the present application by this reference.

An irregularity in the optical pattern can be a deformation of the optical pattern caused by a discontinuous feature on the object. Such a deformation of the optical pattern can be caused at the boundary between two continuous sections of an object. For example, the boundary could be the edge of a cube at which two faces of the cube meet. Accordingly, a discontinuous feature on the object can be where the gradient of the surface of the object changes significantly. The greater the gradient of the surface, the greater the deformation of the optical pattern at that point on the surface. Accordingly, a discontinuity could be identified by identifying those points on the object at which the optical pattern is deformed by more than a predetermined threshold. This predetermined threshold will depend on a number of factors, including the size and shape of the object to be measured. The predetermined threshold can be determined and set prior to operation by a user based on the knowledge of the object to be measured.

In embodiments in which the optical pattern is a fringe pattern, an irregularity can be identified by identifying those points on the object at which the phase of the fringe pattern changes above a predetermined threshold.

According to a second aspect of the invention there is provided an apparatus for inspecting an object via phase analysis, the apparatus comprising: a projector configured to project a optical pattern onto the surface of an object to be measured, the projector being moveable relative to the object; an imaging device configured to obtain a plurality of images of the object on which the optical pattern is projected; and in which the projector is configured to be moved relative to the object between obtaining the phase-shifted images to cause a change in phase of the optical pattern on the object. As will be understood, the apparatus can further comprise an image analyser configured to analyse the images to obtain topographical surface data.

According to a third aspect of the invention there is provided a non-contact method for inspecting an object via phase analysis, comprising in any suitable order: i) a projector projecting an optical pattern onto the surface of an object to be inspected; ii) an imaging device obtaining a plurality of phase-shifted images of the optical pattern on the surface, in which the projector and imaging device are in a fixed spatial relationship relative to each other and in which the position of the optical pattern on the object is moved between images by relative movement between the projector relative to the object about the imaging device's perspective centre. Rotating about the perspective centre can be advantageous as the imaging device's perspective of the object does not change so points on the object hidden due to occlusion before the rotation will also be hidden due to occlusion after the rotation. It has been found that rotating about the imaging device's perspective centre makes it easier to process the images to compensate for any relative movement between the object and imaging device. In particular it makes matching corresponding pixels across a number of images easier. For example, matching corresponding pixels is possible using a coordinate transformation which is independent of the distance between the object and the imaging device. Accordingly, it is not necessary to know the distance between the object and imaging device in order to process the images to compensate for any relative movement between the object and imaging device.

The method can further comprise iii) processing the phase-shifted images to obtain topographical surface data.

According to a fourth aspect of the invention there is provided computer program code comprising instructions which, when executed by a controller, causes the machine controller to control at least one projector, imaging device and image analyser in accordance with the above described methods.

According to a fifth aspect of the invention there is provided a computer readable medium, bearing computer program code as described above.

Accordingly, this application describes, a non-contact method of measuring an object, comprising in any suitable order the steps of: i) a projector projecting a structured light pattern onto the surface of an object to be measured; ii) an image sensor obtaining a plurality of images of the structured light pattern on the surface, and iii) obtaining topographical data regarding the surface by analysing the plurality of images, in which the method further comprises moving the object and projector relative to each other between obtaining each of the plurality of images. This application also describes, an apparatus for measuring an object located in a measurement space, the apparatus comprising: a projector configured to project a structured light pattern onto the surface of an object to be measured, in which the object and projector are moveable relative to each other such that the position of the structured light pattern on the surface can be changed; an image sensor configured to obtain a plurality of images of the structured light pattern on the surface; and an image analyser configured to obtain topographical data regarding the surface by analysing a plurality of images obtained by the image sensor in which the position of the structured light pattern on the surface is different in each of the plurality of images.

An embodiment of the invention will now be described, by way of example only, with reference to the following Figures, in which:

FIG. 8 illustrates the method of calculating the wrapped phase maps;

FIG. 9 illustrates a first method for obtaining a height map;

FIG. 10 illustrates the a second method for obtaining a height map;

Figure 1:
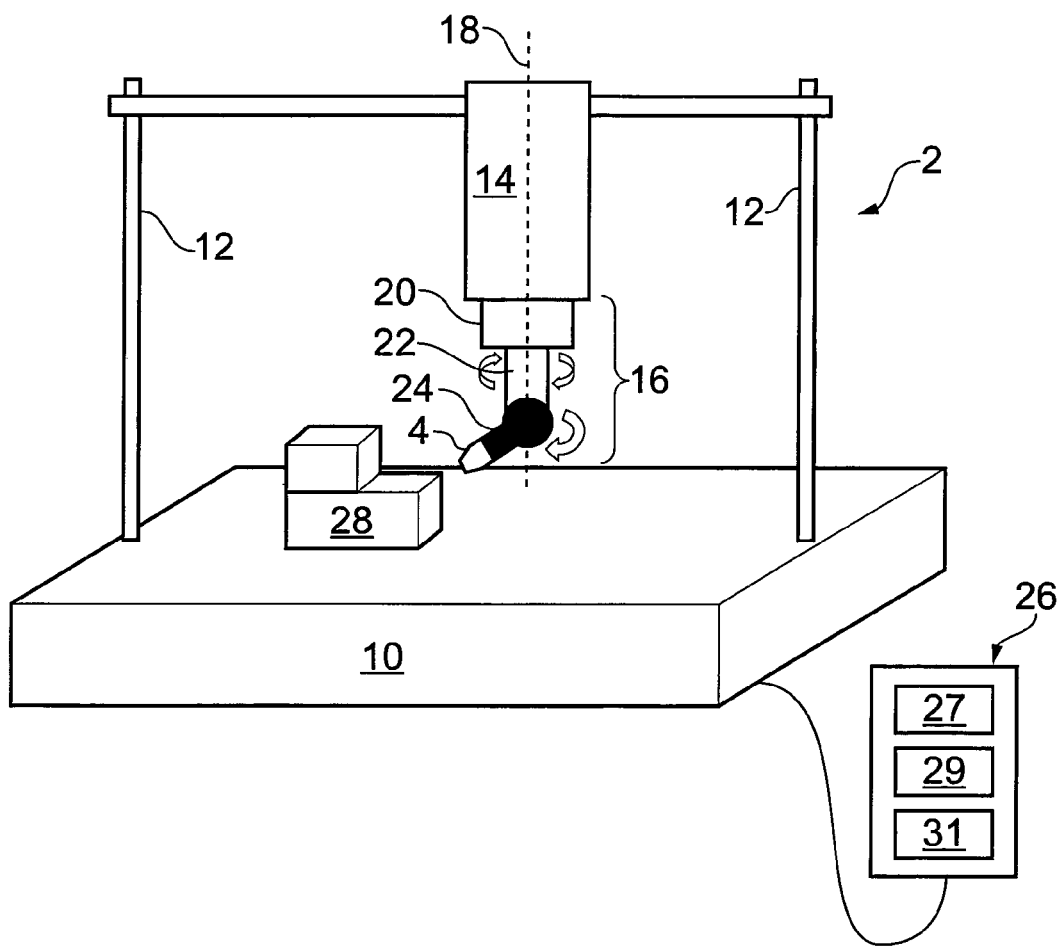
FIG. 1 shows a schematic perspective view of a coordinate measuring machine on which a probe for measuring an object via a non-contact method according to the present invention is mounted.

Referring to FIG. 1, a coordinate measuring machine (CMM) 2 on which a measurement probe 4 according to the present invention is mounted, is shown.

The CMM 2 comprises a base 10, supporting a frame 12 which in turn holds a quill 14. Motors (not shown) are provided to move the quill 14 along the three mutually orthogonal axes X, Y and Z. The quill 14 holds an articulating head 16. The head 16 has a base portion 20 attached to the quill 14, an intermediate portion 22 and a probe retaining portion 24. The base portion 20 comprises a first motor (not shown) for rotating the intermediate portion 22 about a first rotational axis 18. The intermediate portion 22 comprises a second motor (not shown) for rotating the probe retaining portion 24 about a second rotational axis that is substantially perpendicular to the first rotational axis. Although not shown, bearings may also be provided between the moveable parts of the articulating head 16. Further, although not shown, measurement encoders may be provided for measuring the relative positions of the base 10, frame 12, quill 14, and articulating head 16 so that the position of the measurement probe 4 relative to a workpiece located on the base 10 can be determined.

The probe 4 is removably mounted (e.g. using a kinematic mount) on the probe retaining portion 24. The probe 4 can be held by the probe retaining portion 24 by the use of corresponding magnets (not shown) provided on or in the probe 4 and probe retaining portion 24.

The head 16 allows the probe 4 to be moved with two degrees of freedom relative to the quill 14. The combination of the two degrees of freedom provided by the head 16 and the three linear (X, Y, Z) axes of translation of the CMM 2 allows the probe 4 to be moved about five axes.

A controller 26 comprising a CMM controller 27 for controlling the operation of the CMM 2 is also provided, and a probe controller 29 for controlling the operation of the probe 4 and an image analyser 31 for analysing the images obtained form the probe 4. The controller 26 may be a dedicated electronic control system and/or may comprise a personal computer.

The CMM controller 27 is arranged to provide appropriate drive currents to the first and second motors so that, during use, each motor imparts the required torque. The torque imparted by each motor may be used to cause movement about the associated rotational axis or to maintain a certain rotational position. It can thus be seen that a drive current needs to be applied continuously to each motor of the head 16 during use; i.e. each motor needs to be powered even if there is no movement required about the associated rotational axis.

It should be noted that FIG. 1 provides only a top level description of a CMM 2. A more complete description of such apparatus can be found elsewhere; for example, see EP402440 the entire contents of which are incorporated herein by this reference.

Figure 11:
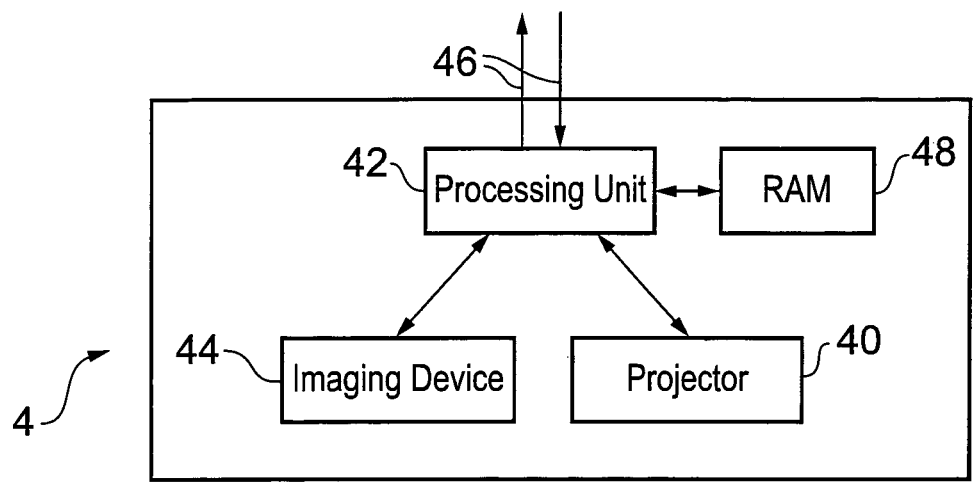
FIG. 11 is a schematic diagram of the components of the probe shown in FIG. 1.

Referring now to FIG. 11, the probe 4 comprises a projector 40 for projecting, under the control of a processing unit 42 a fringe pattern onto the object 28, an imaging device 44 for obtaining, under the control of the processing unit 42 an image of the object 28 onto which the fringe pattern is projected. As will be understood, the imaging device 44 comprises suitable optics and sensors for capturing images of the object 28. In the embodiment described, the imaging device comprises an image sensor, in particular a CCD defining an image plane 62. The imaging device 44 also comprises a lens (not shown) to focus light at the image plane 62.

The processing unit 42 is connected to the probe controller 29 and image analyser 31 in the controller unit 26 such that the processing unit 42 can communicate with them via a communication line 46. As will be understood, the communication line 46 could be a wired or wireless communication line. The probe 4 also comprises a random access memory (RAM) device 48 for temporarily storing data, such as image data, used by the processing unit 42.

As will be understood, the probe 4 need not necessarily contain the processing unit 42 and/or RAM 48. For instance, all processing and data storage can be done by a device connected to the probe 4, for instance the controller 26 or an intermediate device connected between the probe 4 and controller 26.

Figure 12:
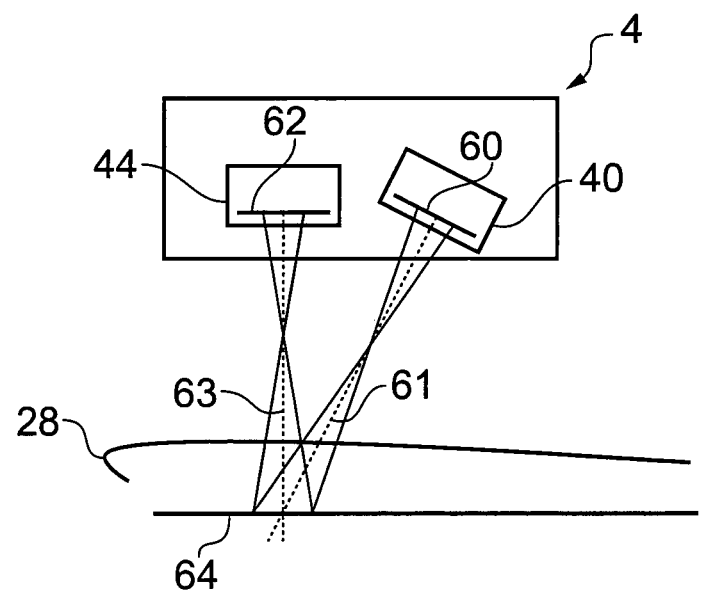
FIG. 12 is a schematic diagram of the positional relationship of the imaging device and projector of the probe shown in FIG. 11.

As illustrated in FIG. 12, the projector's 40 image plane 60 and the imaging device's 44 image plane 62 are angled relative to each other such that the projector's 40 and imaging device's optical axes 61, 63 intersect at a reference plane 64. In use, the probe 4 is positioned such that the fringes projected onto the object's surface can be clearly imaged by the imaging device 44.

Figure 13:
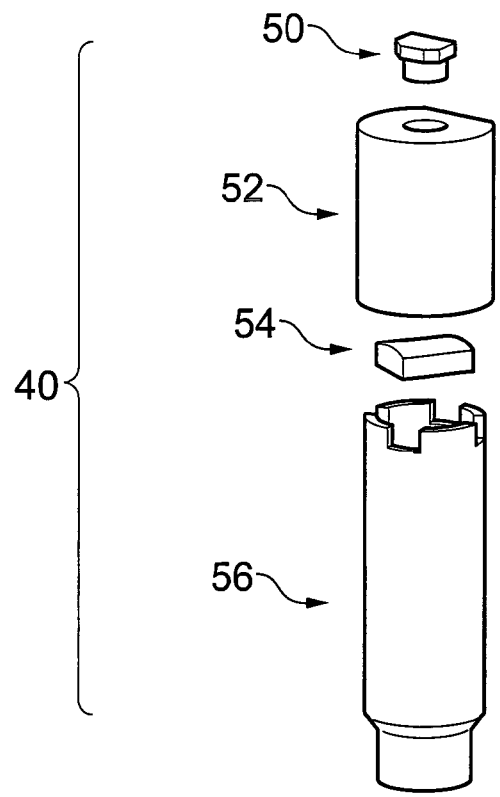
FIG. 13 is a schematic diagram of the projector shown in FIG. 11.

With reference to FIG. 13, the projector 40 comprises a laser diode 50 for producing a coherent source of light, a collimator 52 for collimating light emitted from the laser diode 50, a grating 54 for producing a sinusoidal set of fringes, and a lens assembly 56 for focussing the fringes at the reference plane 64. As will be understood, other types of projectors would be suitable for use with the present invention. For instance, the projector could comprise a light source and a mask to selectively block and transmit light emitted from the projector in a pattern.

In the described embodiment, the periodic optical pattern projected by the projector 40 is a set of sinusoidal fringes. However, as will be understood, other forms of structured light could be projected, such as for example a set of parallel lines having different colours or tones (e.g. alternating black and white lines, or parallel red, blue and green lines), or even for example a set of concentric circles.

Referring to FIGS. 2 to 10, the operation of the probe 4 will now be described.

Figure 4:
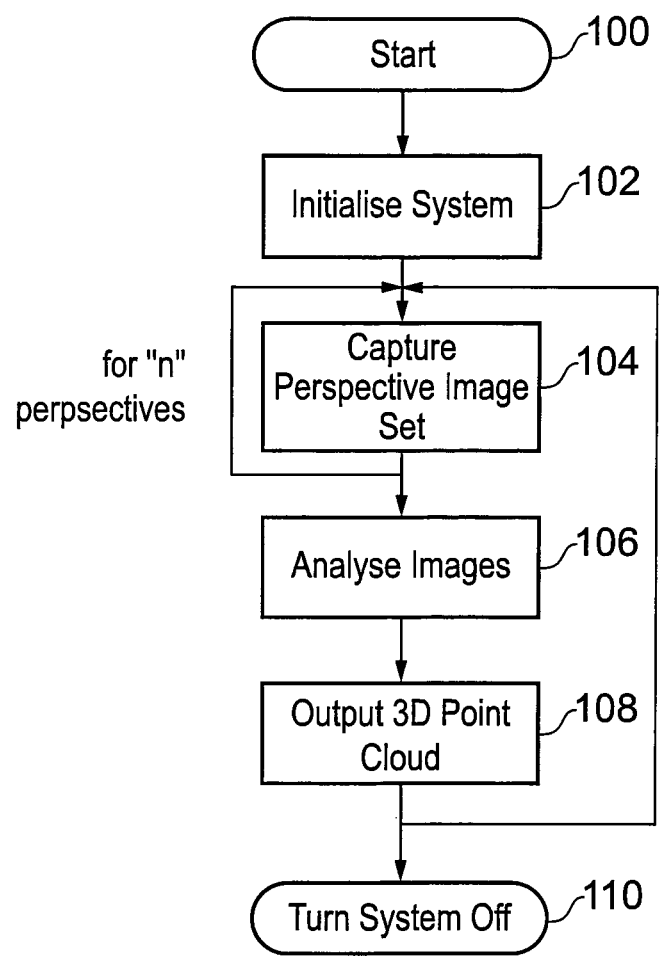
FIG. 4 shows a flow chart illustrating the high-level operation of the apparatus shown in FIG. 1.

Referring first to FIG. 4, the operation begins at step 100 when the operator turns the CMM 2 on. At step 102, the system is initialised. This includes loading the probe 4 onto the articulating head 16, positioning the object 28 to be measured on the base 10, sending the CMM's encoders to a home or reference position such that the position of the articulating head 16 relative to the CMM 2 is known, and also calibrating the CMM 2 and probe 4 such that the position of a reference point of the probe 4 relative to the CMM 2 is known.

Once initialised and appropriately calibrated, control passes to step 104 at which point a set of images of the object 28 is obtained by the probe 4. This step is performed a plurality of times so that a plurality of image sets are obtained, wherein each set corresponds to a different perspective or view point of the object 28. In the example described, three sets of images are obtained corresponding to three different perspectives. The process of obtaining a set of images is explained in more detail below with respect to FIG. 5.

Once all of the images have been obtained, the images are analysed at step 106 by the image analyser 31 in the controller 26. The image analyser 31 calculates from the images a set of three dimensional ("3D") coordinates relative to the CMM 2 which describe the shape of the object 28. The method of analysing the images will be described in more detail below with reference to FIG. 7. The 3D coordinates are then output at step 108 as a 3D point cloud. As will be understood, the 3D point cloud could be stored on a memory device for later use. The 3D point cloud data could be used to determine the shape and dimensions of the object and compare it to predetermined threshold data to assess whether the object 28 has been made within predetermined tolerances. Optionally, the 3D point cloud could be displayed on a graphical user interface which provides a user with virtual 3D model of the object 28.

The operation ends at step 110 when the system is turned off. Alternatively, a subsequent operation could be begun by repeating steps 104 to 108. For instance, the user might want to obtain multiple sets of measurement data for the same object 28, or to obtain measurement data for a different object.

Figures 5, 6:
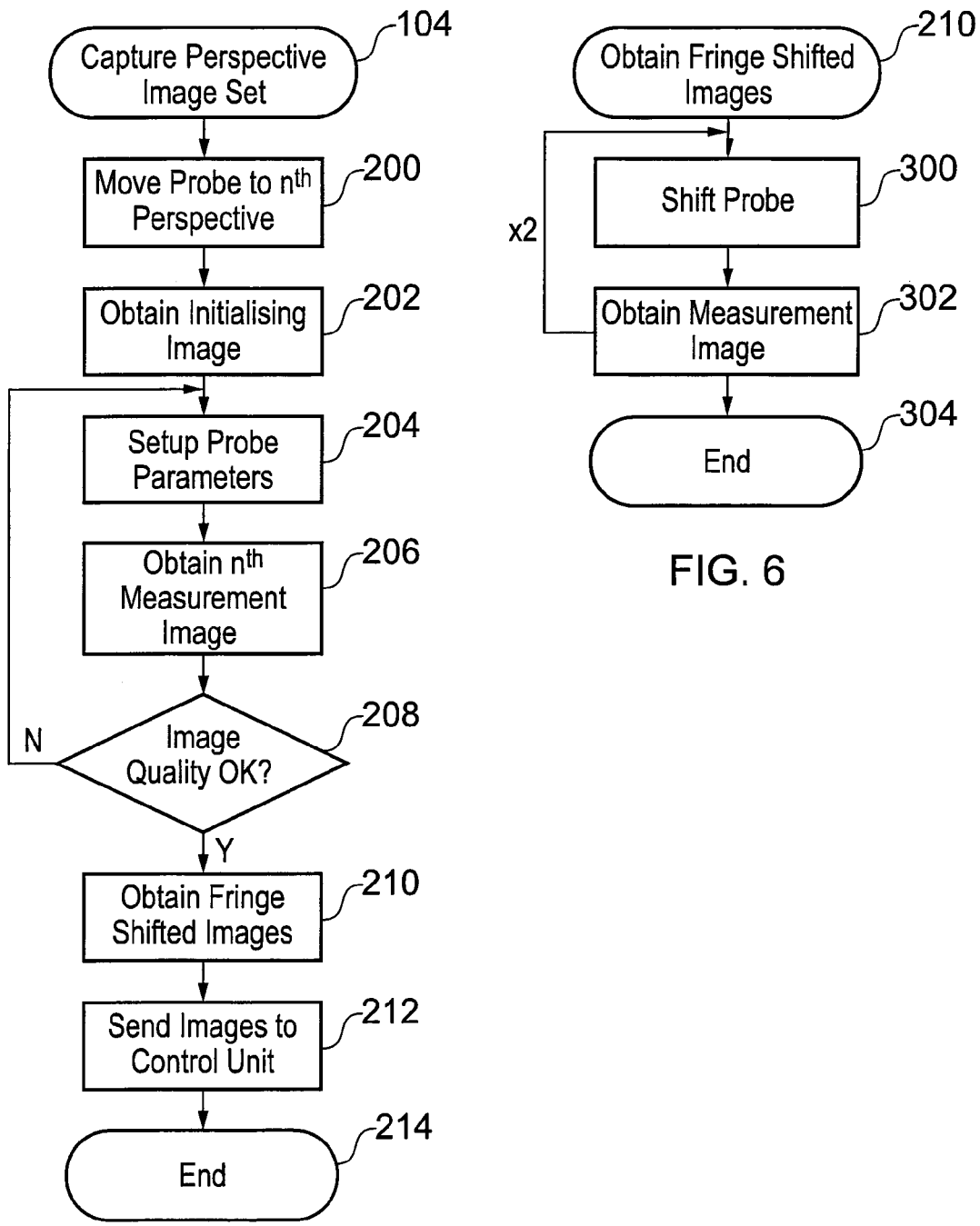
FIG. 5 illustrates the method of capturing a perspective image set.
FIG. 6 illustrates the method of obtaining fringe shifted images.

Referring now to FIG. 5, the process 104 of capturing an image set for a perspective will now be described. The process begins at step 200 at which point the probe 4 is moved to a first perspective. In the described embodiment, the user can move the probe 4 under the control of a joystick (not shown) which controls the motors of the CMM 2 so as to move the quill 14. As will be understood, the first (and subsequent) perspective could be predetermined and loaded into the CMM controller 27 such that during the measurement operation the probe 4 is automatically moved to the predetermined perspectives. Further, on a different positioning apparatus, the user could physically drag the probe 4 to the perspectives, wherein the positioning apparatus monitors the position of the probe 4 via, for example, encoders mounted on the moving parts of the apparatus.

Once the probe 4 is positioned at the first perspective, an initialising image is obtained at step 202. This involves the probe controller 29 sending a signal to the processing unit 42 of the probe 4 such that it operates the imaging device 44 to capture an image of the object 28.

The initialising image is sent back to the image analyser 31 and at step 204, the image is analysed for image quality properties. This can include, for example, determining the average intensity of light and contrast of the image and comparing them to predetermined threshold levels to determine whether the image quality is sufficient to perform the measurement processes. For example, if the image is too dark then the imaging device 44 or projector 40 properties could be changed so as to increase the brightness of the projected fringe pattern and/or adjust the expose time or gain of the imaging device 44. The initialising image will not be used in subsequent processes for obtaining measurement data about the object 28 and so certain aspects of the image, such as the resolution of the image, need not be as high as that for the measurement images as discussed below. Furthermore, in alternative embodiments, a light sensor, such as a photodiode, separate to the imaging device could be provided in the probe to measure the amount of light at a perspective position, the output of the photodiode being used to set up the projector 40 and/or imaging device 44.

Once the projector 40 and imaging device 44 have been set up, the first measurement image is obtained at step 206. What is meant by a measurement image is one which is used in the "analyse images" process 106 described in more detail below. Obtaining the first measurement image involves the probe controller 29 sending a signal to the processing unit 42 of the probe 4 such that the processing unit 42 then operates the projector 40 to project a fringe pattern onto the object 28 and for the imaging device 44 to simultaneously capture an image of the object 28 with the fringe pattern on it.

The first measurement image is sent back to the image analyser 31 and at step 208, the first measurement image is again analysed for image quality properties. If the image quality is sufficient for use in the "analyse images" process 106 described below, then control is passed to step 210, otherwise control is passed back to step 204.

At step 210, fringe shifted images are obtained for the current perspective. Fringe shifted images are a plurality of images of the object from substantially the same perspective but with the position of the fringes being slightly different in each image. The method this step is described in more detail below with respect to FIG. 6.

Once the fringe shifted images have been obtained, all of the images are then sent back to the imager analyser 31 for analysis at step 212. As will be understood, data concerning the position and orientation that the probe 4 was at when each image was obtained will be provided to the image analyser 31 along with each image, such that 3D coordinates of the object 28 relative to the CMM 2 can be obtained as explained in more detail below. The process then ends at step 214.

As explained above, the capture perspective image set process 104 is repeated a plurality of times for a plurality of different perspectives. In this described example, the capture perspective image set process is performed three times, for first, second and third perspectives. The probe 4 is moved to each perspective either under the control of the user or controller as explained above.

With reference to FIG. 6, the process 210 for obtaining the fringe shifted images will now be described. The fringes projected on the object 28 are shifted by physically moving the probe 4 by a small distance in a direction such that the position of the fringes on the object 28 are different from the previous position. As the probe 4 is shifted, the projector 40 within it, and hence the projector's optical axis 61, will also be shifted relative to the object 28. This is what provides the change in position of the fringes of the object 28.

In one embodiment, the probe 4 is moved in a direction that is parallel to the imaging device's 44 image plane and perpendicular to the length of the fringes.

However, this need not necessarily be the case, so long as the position of the fringes on the object is moved. For example, the fringe shifting could be achieved by rotating the probe 4. For instance, the probe 4 could be rotated about an axis extending perpendicular to the projector's image plane 60. Optionally the probe could be rotated about an axis extending perpendicular to the imaging device's 44 image plane. In another preferred embodiment the probe 4 can be rotated about the imaging device's 44 perspective centre. This is advantageous because this ensures that the perspective of the features captured by the imaging device 44 across the different images will be the same. It also enables any processing of the images to compensate for relative movement of the object and image sensor to be done without knowledge of the distance between the object and image sensor.

Figure 17:
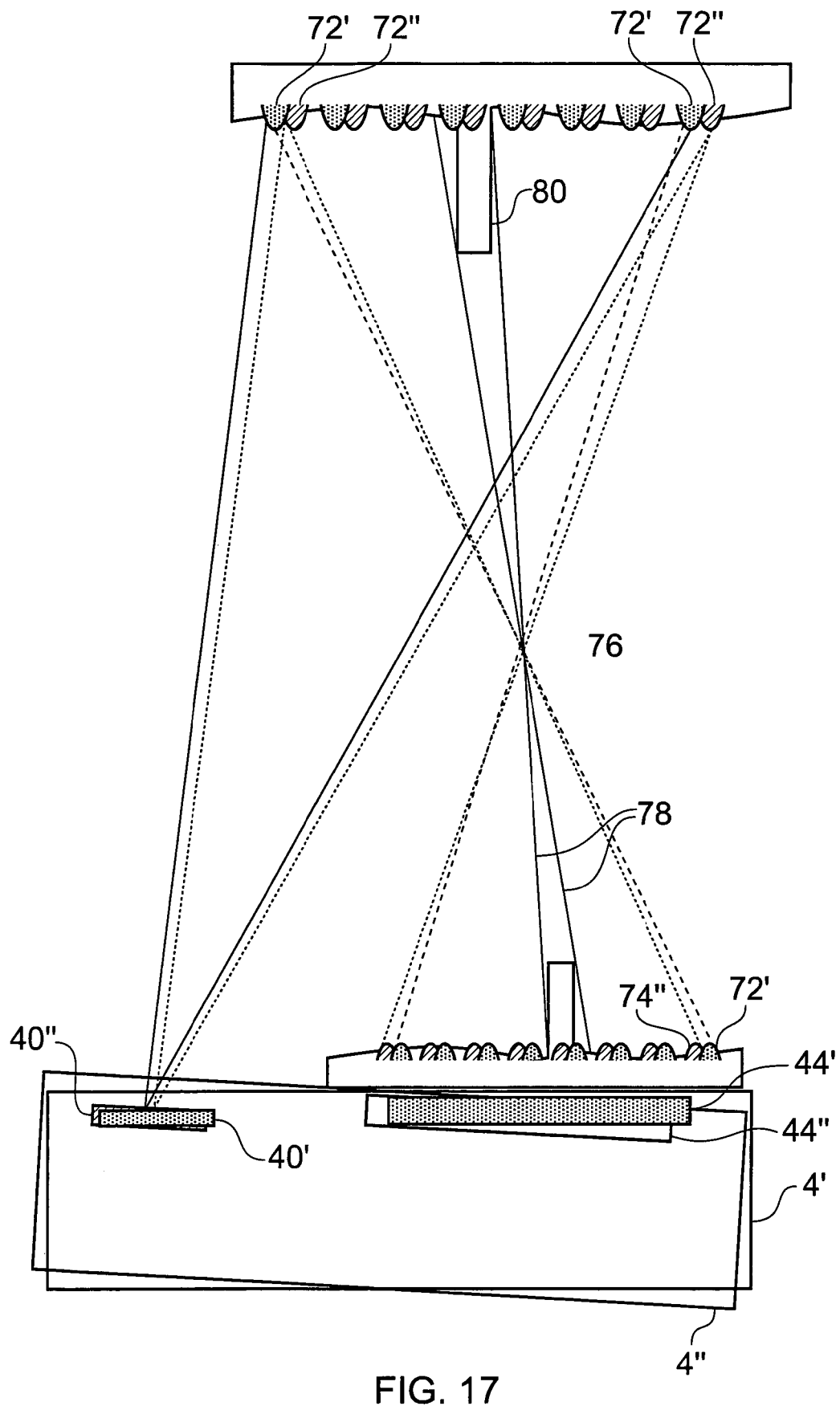
FIG. 17 illustrates obtaining fringe shifted images by causing rotation about the image sensor's perspective centre.

For example, with reference to FIG. 17 the probe 4 is located at a first position (referred to by reference numeral 4') relative to an object 70 to be inspected. At this instance the probe's projector 40 is at a first position (referred to by reference numeral 40') which projects a fringe pattern illustrated by the dotted fringe markings 72' on the object 70. An image 74 of the object with the fringe markings 72' is captured by the imaging device 44 which is at a first position referred to by reference numeral 44'.

The probe 4 is then moved to a second position, referred to by reference numeral 4", by rotating the probe 4 relative to the object 70 about the imaging device's perspective centre. As will be understood, an imaging device's perspective centre is the point through which all light rays that intersect with the image plane are assumed to pass. In the figure shown, the perspective centre is referred to by reference numeral 76.

As can be seen, at the second position the projector, referred to by reference numeral 40", has moved such that the position of the fringe pattern on the object 70 has moved. The new position of the fringe pattern on the object 70 is illustrated by the striped fringe markings 72" on the object 70. An image 74 of the object is captured by the imaging device at its second position 44". As can be seen, although the position of the image of the object on the imaging device 44 has changed between the first 44' and second 44" positions of the imaging device, the perspective the imaging device 44 has of the object 70 does not change between the positions. Accordingly, for example, features that are hidden due to occlusion in one image will also be hidden due to occlusion in the second. This is illustrated by the rays 78 illustrating the view the imaging device 44 has of the tall feature 80 on the object. As can be seen, because the imaging device 44 is rotated about its perspective centre, the rays 78 are identical for both positions and so only the location of the feature on the imaging device 44 changes between the positions, not the form of the feature itself.

Accordingly, rotating about the perspective centre can be advantageous as the image sensor's perspective of the object does not change thereby ensuring that the same points on the object are visible for each position. Furthermore, for any point viewed, the distance between the image points of it before and after the relative rotation of camera and object is independent of the distance to the object. That is, for an unknown object, if the camera is rotated about its own perspective centre it is possible to predict, for each imaged point before the rotation, where it will be imaged after rotation. The position of an image point after the rotation depends on the position of the initial image point, the angle (and axis) of rotation, and the internal camera parameters—all known values. Accordingly, as is described in more detail below, rotating about the perspective centre allows the relative motion to be compensated for without knowing the distance to the object.

The probe 4 is moved a distance corresponding to a fringe shift of ¼ period at the point where the imaging device's 44 optical axis 63 intersects the reference plane 64. As will be understood, the actual distance the probe 4 is moved will depend on the period of the fringes projected and other factors such as the magnification of the projector 40.

Once the probe 4 has been shifted, another measurement image is obtained at step 302. The steps of shifting the probe 300 and obtaining a measurement image 302 is repeated two more times. Each time, the probe is shifted so that for each measurement image the position of the fringe pattern on the object is different for all previous images. Accordingly, at the end of the obtain fringe shifted images process 210 four images of the object have been obtained for a given perspective, with the position of the fringe pattern on the object for each image being slightly different.

Figure 2:
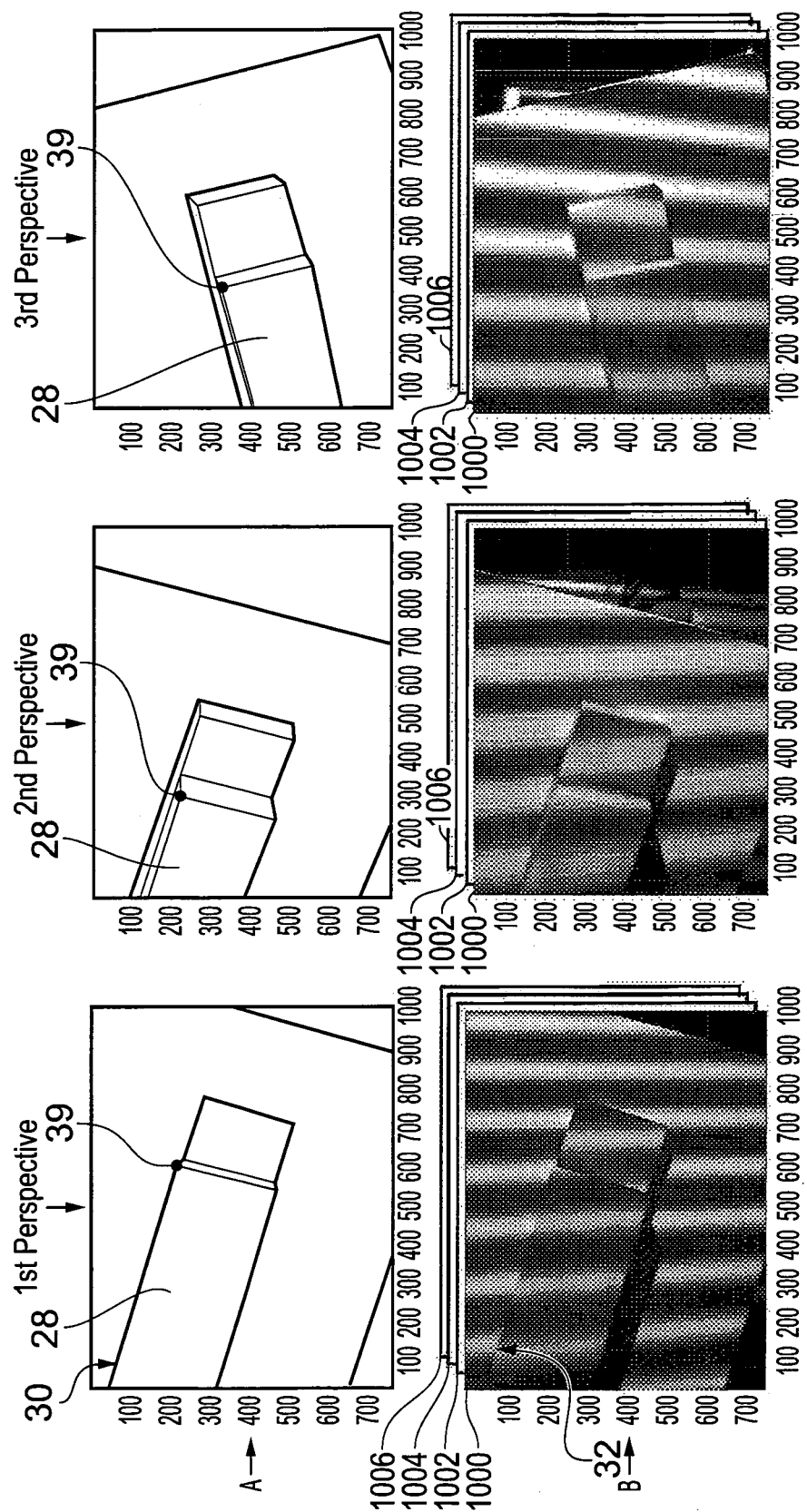
FIG. 2 illustrates various images of the object shown in FIG. 1 obtained by the probe from three different perspectives.
Figure 14:
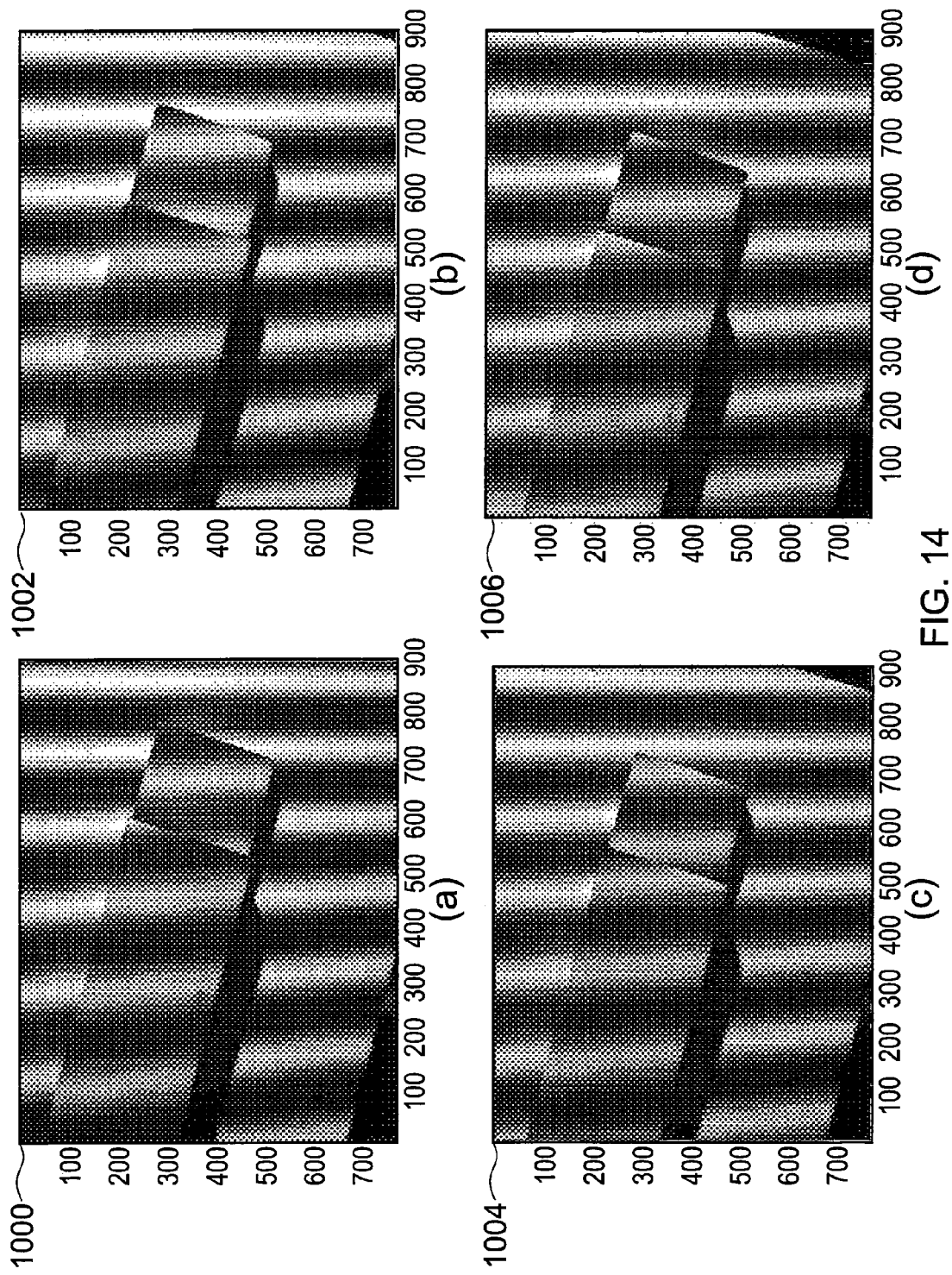
FIG. 14 illustrates a set of fringe shifted images, the position of the fringe on the object being different in each image.

Reference is now made to FIG. 2. Row A shows the view of the object 28 at each of the three perspectives with no fringes projected onto it. Row B illustrates, for each of the first, second and third perspectives the image 1000 that will be obtained by the imaging device 44 at step 206 of the process for capturing a perspective image set 104. Schematically shown behind each of those images 1000 are the fringe shifted images 1002, 1004 and 1006 which are obtained during execution of steps 300 and 302 for each of the first, second and third perspectives. FIGS. 14(*a*) to 14(*d*) shows an example of the images 1000-1006 obtained for the first perspective. As shown, the relative position of the object and imaging device has moved slightly between obtaining each image in an image set for a perspective, and this needs to be taken into consideration and/or compensated for during processing of the images as described in more detail below (especially as described in connection with FIG. 8).

Accordingly, once the step 104 of capturing the first, second and third image sets has been completed, the image analyser 31 will have a set of images 1000-1006 for each of the first, second and third perspectives.

Figure 7:
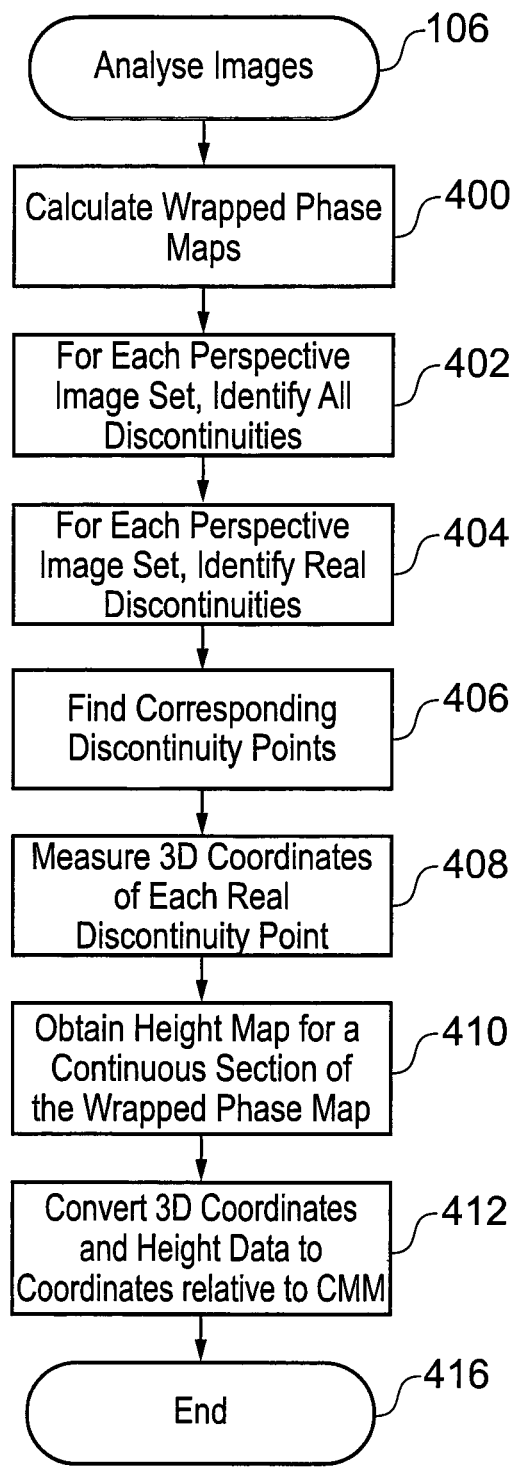
FIG. 7 illustrates the method of analysing the images.

The process 106 for analysing the images will now be described with reference to FIG. 7. The process begins at step 400 at which point four wrapped phase maps are calculated for each of the first, second and third perspectives. As will be understood, a wrapped phase map is a map which contains the phase of the fringes projected onto the object's surface for a plurality of pixels in one of the measurement images in a perspective image set, where the phase angle is bound within a range of 360 degrees.

For a given perspective, a wrapped phase map is obtained using each of the four phase shifted images for that perspective in a particular order. The four wrapped phase maps for a given perspective are obtained by using each of the four phase shifted images in different orders. The method for obtaining a wrapped phase map will be explained in more detail below with reference to FIG. 8.

As will be understood, it need not be necessary to calculate four wrapped phase maps for each perspective. For instance, two or more wrapped phase maps could be calculated for each of the perspectives. As will be understood, the more wrapped phase maps that are calculated, the more reliable the determination of real discontinuities as explained in more detail below, but the more processing resources required.

Figure 3:
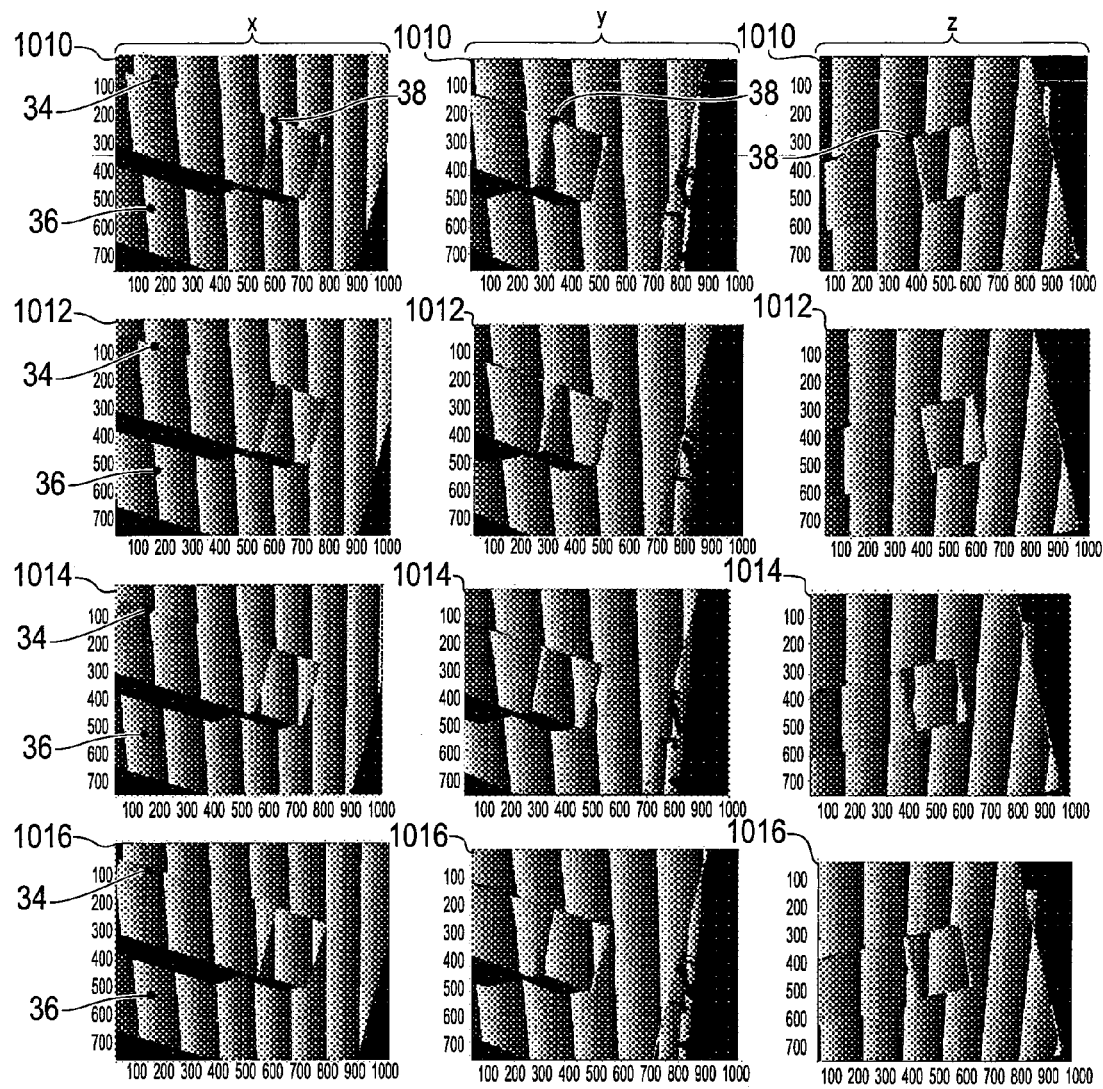
FIG. 3 illustrates a plurality of wrapped phase maps for each of the three different perspectives.

Referring to FIG. 3, columns X, Y and Z illustrate for each of the different perspectives four different wrapped phase maps 1010, 1012, 1014 and 1016. Each of those wrapped phase maps for a given perspective has been calculated using a unique order of the four different images 1002-1006 for that perspective. Four different wrapped phase maps 1010-1016 for each perspective are calculated in order to be able to distinguish between those discontinuities caused by features on the object 28 and those discontinuities caused by the wrapping of the phase, as explained in more detail below.

As can be seen from the images in row B of FIG. 2, a feature, such as an edge or corner on the object 28 causes a discontinuity in the fringe pattern. For example, edge 30 on the object 28 causes a discontinuity in the fringe pattern along line 32 in the image of the object 28 with the fringe projected on it. Accordingly, it is possible to identify features of the object 28 by identifying discontinuities in the fringe pattern.

At step 402, discontinuities in the fringe pattern are identified for each of the perspectives. This is achieved by identifying discontinuities in each of the wrapped phase maps. A discontinuity in a wrapped phase map is identified by comparing the phase value of each pixel to the phase values of adjacent surrounding pixels. If the difference in the phase value between adjacent pixels is above a threshold level, then one of those pixels identifies a discontinuity point. As will be understood, it is not important which one of those pixels is selected as the discontinuity point so long as the selection criteria is consistent for the selection of all discontinuity points, e.g. always select the pixel to the left or to the top of the difference, depending on whether the differences between adjacent pixels are being calculated in the x or y direction along the image. As will be understood, the positions of the discontinuities, once found by the above described method, can be refined if required using image processing techniques, for example by looking at the gradient of the phase, or the gradient of the intensities in the measurement images in the surrounding region, in order to find the location of the discontinuity to sub-pixel accuracy, for example as described in J. R. Parker, "Algorithms for image processing and computer vision", John Wiley and Sons, Inc (1997).

The preferred threshold level depends on a number of factors including the object shape, level of noise in the image and period of the fringe pattern. The threshold level could be set by a user prior to the operation or could be calculated from an analysis of the image itself.

For example, referring to the first wrapped phase map 1010 (in FIG. 3) for the first perspective, a discontinuity will be identified between adjacent pixels at point 34 due to the difference in the phase value caused by the distortion along line 32 of the fringe due to the edge 30. This discontinuity will also be identified in the other wrapped phase maps 1012, 1014 and 1016 at the same point 34.

Other discontinuities will also be identified in the wrapped phase maps 1010-1016, such as for example all the way along line 32, which corresponds to the edge 30.

It is possible that the above process could result in false discontinuities being identified due to the phase map being wrapped. For example, adjacent pixels might have phase values of, for instance, close to 0degrees and 360 degrees respectively. If so, then it would appear as if there has been a large phase jump between those pixels and this would be identified as a discontinuity. However, the phase jump has merely been caused as a result of the wrapping around of the phase, rather than due to a discontinuity in the surface of the object being measured. An example of this can be seen in the first wrapped phase map 1010 for the first perspective at point 36 where the phase values jump from 360 degrees to 0 degrees (illustrated by the dark pixels and light pixels respectively). The phase value for adjacent pixels will jump significant at point 36 due to the phase map being wrapped.

Accordingly, once all discontinuities have been identified for each of the four wrapped phase maps for a given perspective, then falsely identified discontinuities are removed at step 404. This is achieved by comparing the discontinuities for each of the wrapped phase maps for a given perspective, and only keeping the discontinuities that appear in at least two of the four wrapped phase maps. As will be understood, a more stringent test could be applied by, for example, only keeping the discontinuities that appear in three or four of the wrapped phase maps. This can help overcome problems caused by noise on the images. This process 404 is performed for each of the first to third perspective image sets.

For example, as mentioned above a discontinuity would have been identified at point 36 in the first wrapped phase map 1010 for the first perspective. However, when looking at the other wrapped phase maps 1012 to 1016 for the first perspective, a discontinuity would not have been identified at that same point 36. This is because the different wrapped phase maps have been calculated using a different order of the fringe shifted images 1000 to 1006, thereby ensuring that the phase wrapping in the wrapped phase maps occurs at different points. Accordingly, as the discontinuity identified at point 36 in the first wrapped phase map 1010 is not also identified in the other wrapped maps 1012 to 1016, then that discontinuity can be discarded.

However, as the discontinuity at point 34 in the first wrapped phase map 1010 has been confirmed by discontinuities identified at the same point 34 in all the other wrapped phase maps 1012 to 1014, point 34 is identified as a real discontinuity, i.e. a discontinuity caused by a feature on the object 28, rather than as a result of phase wrapping.

At step 406, corresponding discontinuity points between each of the perspectives are identified. Corresponding discontinuity points are those points in the wrapped phase maps which identify a discontinuity caused by the same feature on the object 28. For example, discontinuity point 38 on each of the first wrapped phase maps 1010 for each of the first, second and third perspectives all identify the same corner 39 on the object 28. Corresponding discontinuity points can be determined by known matching techniques and, for example, utilising epipolar geometry. Such known techniques are described, for example in A. Gruen, "Least squares matching: a fundamental measurement algorithm" in K. B. Atkinson (ed.), "Close range photogrammetry and machine vision", Whittles Publishing (2001). The correlated discontinuity points can then be used as target points, the 3D coordinates of which relative to the probe 4 can be determined at step 408 by known photogrammetry techniques, such as those described in, for example, M. A. R Cooper with S. Robson, "Theory of close-range photogrammetry" in K. B. Atkinson (ed.), "Close range photogrammetry and machine vision", Whittles Publishing (2001).

Accordingly, after step 408 a number of discrete points on the object 28 will have been identified and their position relative to the probe 4 measured.

At step 410, a height map for a continuous section of the object 28 is calculated. A height map provides information on the height of the surface above a known reference plane 6 relative to the probe 4. A continuous section is an area of the object enclosed by discontinuous features, e.g. the face of a cube which is enclosed by four edges. Continuous sections can be identified by identifying those areas in the wrapped phase map which are enclosed by discontinuity points previously identified in steps 402 to 406. The height map provides measurement data on the shape of the surface between those discrete points. Methods for obtaining the height map for a continuous section are described below in more detail with respect to FIGS. 9 and 10. Steps 410 could be performed a plurality of times for different continuous sections for one or more of the different perspectives.

As is usual in similar fringe analysis systems, the unwrapped phase map is correct only to some unknown multiple of $2\pi$ radians, and therefore the height above the reference plane 64 may be wrong by whatever height corresponds to this unknown phase difference. This is often called $2\pi$ ambiguity. The measured 3D coordinates of the real discontinuities obtained in step 408 are used in order to resolve these ambiguities.

At this stage, the 3D coordinates of the real discontinuity points obtained in step 408 and the height map data obtained in step 410 provide the position of the object relative to a predetermined reference point in the probe 4. Accordingly, at step 412, these coordinates are converted to 3D coordinates relative to the CMM 2. This can be performed using routine trigonometry techniques as the relative position of the CMM 2 and the reference point in the probe 4 is known from calibration, and also because the position and orientation of the probe 4 relative to the CMM 2 at the point each image was obtained was recorded with each image.

The process for calculating a wrapped phase map 400 will now be described with reference to FIG. 8. Calculating a wrapped phase map comprises calculating the phase for each pixel for one of a set of fringe-shifted images. This can be done using various techniques, the selection of which can depend on various factors including the method by which the fringe-shifted images are obtained. Standard phase-shifting algorithms rely on that the relative position between the object and imaging device 44 is the same across all of the fringe-shifted images. However, if either of the methods described above (e.g. either moving the probe 4 laterally or rotating it about the imaging device's perspective centre) are used to obtain the fringe-shifted images then the imaging device 44 will have moved a small distance relative to the object. Accordingly, for each successive image in a perspective image set, a given pixel in each image will be identifying the intensity of a different point on the object. Accordingly, if standard phase-shifting algorithms are to be used it is necessary to identify across all of the fringe shifted images which pixels correspond to same point on the object, and to then compensate for this. One way of doing this when the imaging device 44 has moved laterally is to determine by how much and in what direction the imaging device 44 has travelled between each image, and by then cropping the images so that each image contains image data common to all of them. For example, if the movement of the imaging device 44 between two images means that a point on an object has shifted five pixels in one dimension, then the first image can be cropped to remove five pixel widths worth of data.

Figure 15:
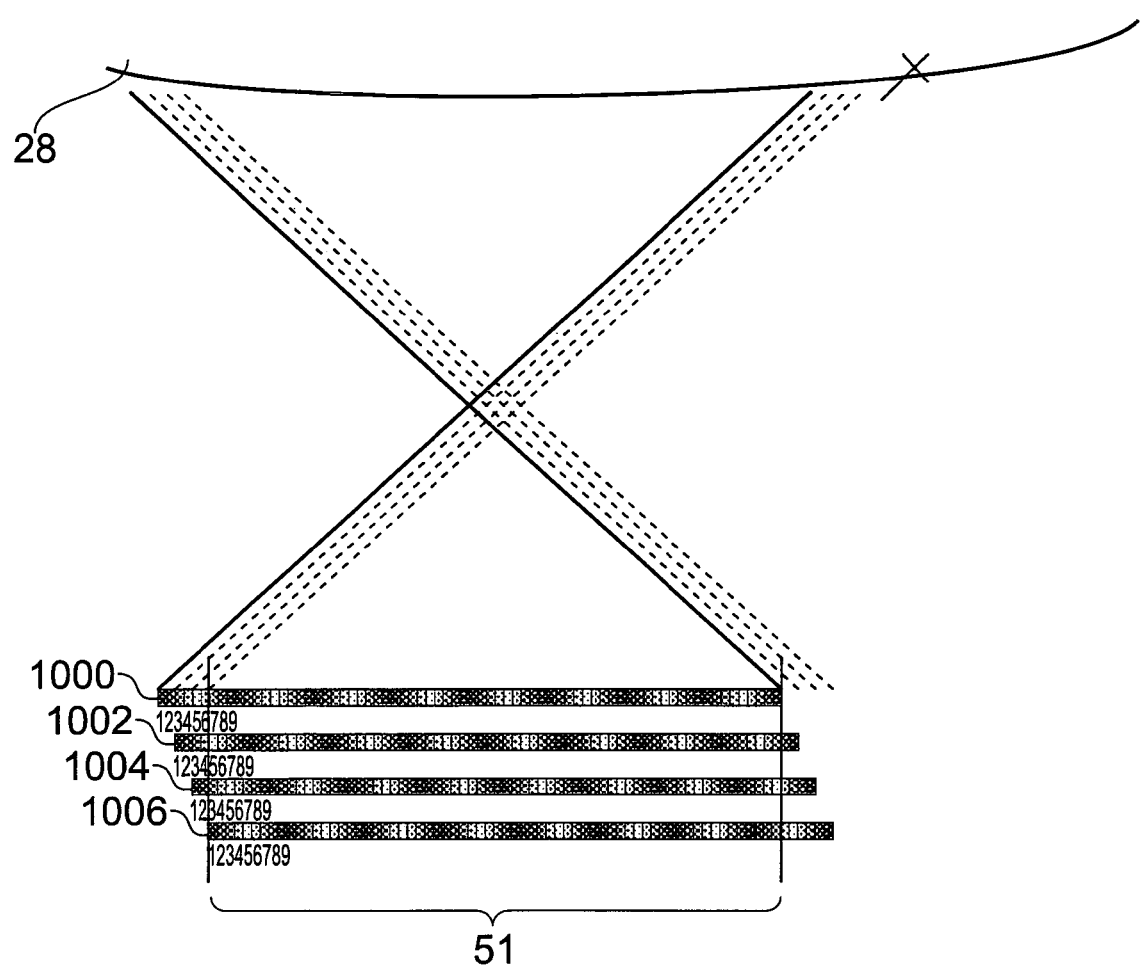
FIG. 15 illustrates the effect of moving the image sensor relative to the object.

This can be seen more clearly with reference to FIG. 15 which schematically illustrates corresponding rows of pixels for each of the first 1000, second 1002, third 1004 and fourth 1006 images. As can be seen, due to relative movement of the imaging device 44 and the object 28 between the images, the same point on an object is imaged by different pixels in each image. For instance, point X on the object 28 is imaged by the $7^{th}$ pixel from the left for the first image 1000, the $5^{th}$ pixel from the left for the second image 1002, the $3^{rd}$ pixel from the left for the third image 1004 and the $4^{th}$ pixel from the left for the fourth image 1006. An effective way of compensating for the relative movement of the image sensor and object 28 is to crop the image data such that each image 1000-1006 contains a data representing a common region, such as that highlighted by window 51 in FIG. 15.

Figure 18:
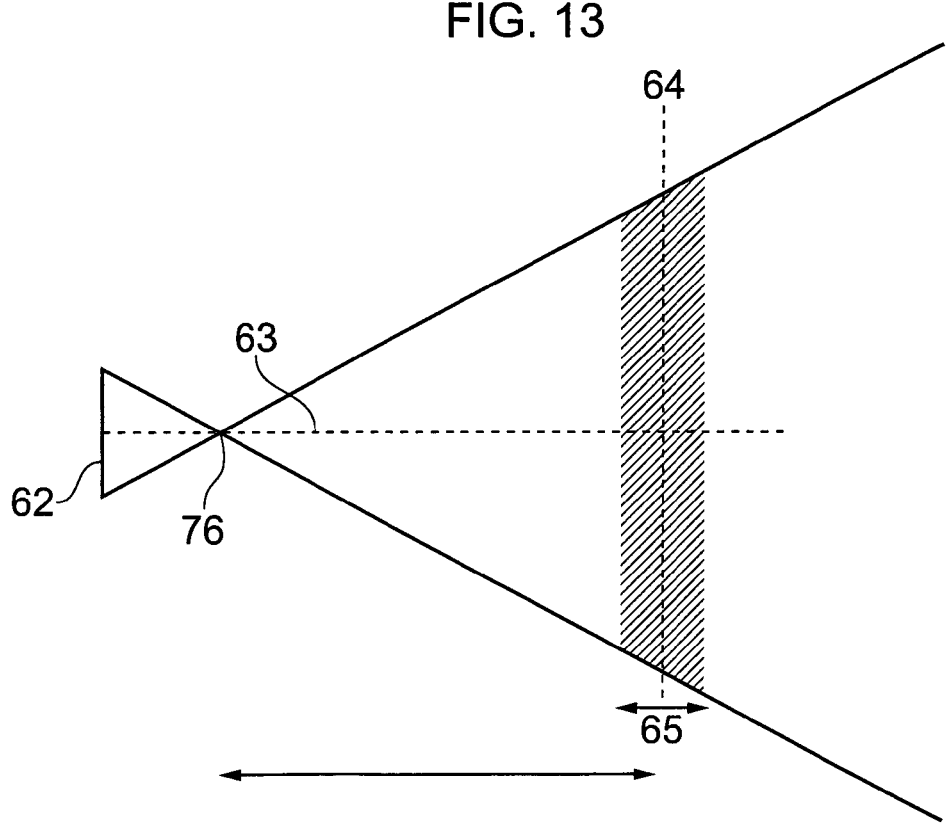
FIG. 18 illustrates the stand-off distance and depth of field of an imaging device.

Cropping the images is one example of a coordinate transformation, where the transformation is a linear function. This can be most accurate in situations where the distance to the object is known, or, for instance, where the stand-off distance is large compared to the depth of the measuring volume. As will be understood, and with reference to FIG. 18, the stand-off distance is the distance from the imaging device's perspective centre 76 to the centre of the imaging device's measurement volume and the depth of field 65 or depth of measurement volume is the range over which images recorded by the device appear sharp. In other words, the stand-off distance is the nominal distance from the probe 4 to the object to be measured. For instance, if the ratio of stand-off distance to depth of measuring volume is around 10:1 then there can be an error of up to 10% in the compensation for some pixels. If either the stand-off distance is not large compared to the depth of the measuring volume, or if the relative motion is not a linear translation, then the most appropriate coordinate transformation to compensate for relative motion of the imaging device and the object can depend, in general on the distance to the object and the actual motion. However, it has been found that if the motion is rotation about the imaging device's 44 perspective centre then the coordinate transformation that best compensates for the motion is independent of the unknown distance to the object. This is due to the geometry of the system and the motion. Furthermore, this enables accurate compensation to be performed even if the stand-off distance is not large compared to the depth of the measuring volume, for instance in situations in which the ratio of stand-off distance to depth of measuring volume is less than 10:1, for example less than 5:1, for instance 1:1.

Accordingly, this enables measurement of an object to be performed even when the probe is located close to the object.

Once the pixel data has been compensated for the relative motion so that the same pixel in each adjusted image represents the same point on the object, the next step 502 involves using a phase-shifting algorithm to calculate the wrapped phase at each pixel. A suitable phase-shifting algorithm not requiring known phase shift, for instance the Carré algorithm, may be used to calculate the wrapped phase, phase shift and modulation amplitude.

The process for calculating a wrapped phase map 400 is repeated three further times for each perspective image set, each time using the phase shifted images in a different order, so as to obtain four wrapped phase maps for each perspective. Accordingly, in the process for calculating the wrapped phase maps 400 is performed twelve times in total.

A first process for obtaining the height map 410 will now be described with reference to FIG. 9. The method involves at step 600 unwrapping the continuous section of one of the phase maps by adding integer multiples of 360 degrees to the wrapped phase of individual pixels as required to remove the discontinuities found due to the phase calculation algorithm. The method then involves converting the unwrapped phase map to a height map for that continuous section at step 602. The phase for a pixel is dependent on the relative height of the surface of the object. Accordingly, it is possible, at step 602 to create a height map for the continuous section from that phase by directly mapping the phase value of each pixel to a height value using a predetermined mapping table and procedure.

In contrast to the methods for calculating a wrapped-phase map described above in connection with FIG. 8, i.e. in which the image coordinates are compensated for, it has been found that there is another way to calculate the wrapped phase when the object and imaging device 44 are moved relative to each other which doesn't require image coordinate compensation. This method relies on the fact that a pixel of the imaging device's 44 CCD will be viewing a different point on the object for each different image. If the points viewed by a single pixel in multiple images are at different distances to the imaging device 44, then a different phase will be recorded at that pixel in each image. That is, the phase of the fringe pattern at that pixel will be shifted between each image. The actual phase shift will depend on the distance to the object and on the gradient of the object, as well as the known relative motion of the imaging device 44 and object and the fixed system parameters. The phase shift will therefore vary across the image.

Figure 16:
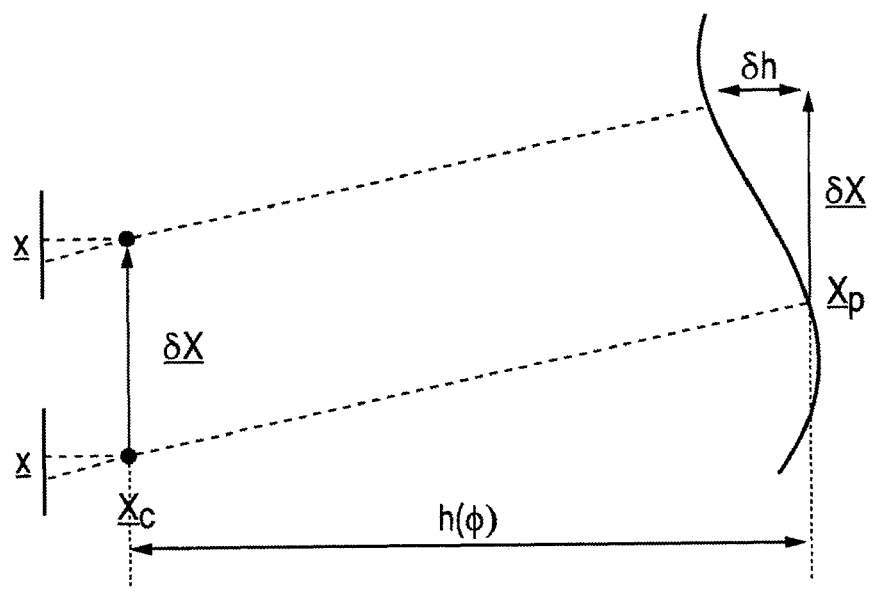
FIG. 16 illustrates how the gradient of the object surface can be determined from the phase shift.

As an example, with reference to FIG. 16, consider an object point Xp, imaged at x in the camera plane. If the imaging device 44 is translated by some vector dX with respect the the plane, then the point imaged by the imaging device 44 will change, as show. For clarity, the projector 40 is omitted from the diagram, but it is to be understood that the imaging device 44 and projector 40 are fixed with respect to each other.

h is the distance from the imaging device's 44 perspective centre to the object point imaged at x, and δh is the change in this distance after translation δX. a is the known direction of the imaging device's optic axis, and $X_c$ is the position of the perspective centre, also known. The change in h due to the motion of the imaging device 44 only is equal to δX.a. If this quantity is zero, so that the motion is perpendicular to the imaging device axis and parallel to the image plane, then any remaining change in h must be due to the object shape.

The change in h is actually recorded as a change in phase, δϕ, where, again, this will consist of a component caused by the shape of the object, and a component caused by any motion of the imaging device parallel to its axis.

To measure the phase at a given pixel, we take multiple phase shifted images. The intensity recorded at a pixel in image k can be expressed as $$I_k = A + B \cos \phi_k$$

where:
A=offset (i.e. the average intensity of the fringe pattern projected onto the object as recorded by that pixel, including any background light);
B=amplitude modulation of the light intensity recorded by that pixel; and $$\phi_k = \phi_{k-1} + \Delta\phi_k \approx \phi_k + \underline{\nabla}\phi_{k-1} \cdot \underline{\delta X_k}, \ k>0$$

using a first order Taylor series expansion, which assumes that the translation δX is small.

The Carré algorithm is used to calculate for each pixel in a given image in an image set, the phase and phase shift and modulation amplitude from the four phase-shifted images. The Carré algorithm assumes that the four shifts in phase are equal. This will be the case, for instance, if the motion used is a translation and the surface is planar. If this is not the case then a good approximation can be obtained by choosing motion that it small enough that the surface gradient does not vary significantly over the scale of the motion.

The phase data can be converted to height data. Optionally the phase shift data can be converted to gradient data and subsequently to height data using the method described below in connection with FIG. 10.

The above described method provides optimum results when the object's reflectivity and surface gradient is substantially constant on the scale of the relative motion. Accordingly, it can be preferred that the motion between the images in an image set is small. Areas of the surface at too low or too high a gradient relative to the imaging device, or with a high degree of curvature, can be detected by inspecting the modulation amplitude returned by the Carré algorithm, and can subsequently be measured by changing the relative motion used to induce the phase shift and if necessary by viewing the object from a different perspective.

A Carré algorithm provides both phase and phase shift data for each pixel in an image. The above methods described above in connection with FIG. 9 use the phase data to obtain the height data. However, it has been possible to obtain the height information using the phase-shift data. In particular, a second process for obtaining the height map 410 will now be described with reference to FIG. 10. This method begins at step 700 by, for a continuous section (which is identifiable from the discontinuities previously identified as explained above), calculating a phase shift map using a Carré algorithm on all of the images in a perspective image set. The phase shift for a pixel is dependent on the gradient of the surface of the object and how far away the object is from the probe 4. Accordingly, it is possible, at step 702 to create a gradient map for the continuous section from that phase shift by directly mapping the phase shift value of each pixel to a gradient value using a predetermined mapping table and procedure. At step 704, the gradient map is then integrated in order to get a height map for the continuous surface relative to the probe 4. The measured 3D coordinates of the real discontinuities obtained in step 408 are used in order to resolve the constant of integration to find the height above the reference plane 64.

It is an advantage of the invention that the projector may consist simply of a grating, light source, and focussing optics. There is no need for any moving parts within the projector or for a programmable projector—only one pattern is required to be projected. Furthermore, no information about the distance to the object is required, except that it (or a section of it) is within the measuring volume—there is no requirement to have a large stand-off distance compared to the measurement volume. Furthermore, the motion between the object and probe unit need not necessarily be in any particular direction, and may be produced by a rotation rather than a translation or a combination of the two.

As will be understood, the above provides a detailed description of just one particular embodiment of the invention and many features are merely optional or preferable rather than essential to the invention.

In the described embodiments the probe is mounted on a mounting structure equivalent to the quill of a CMM. This invention is also suitable for use with planning the course of motion of a measurement device mounted on other machine types. For example, the probe 4 could be mounted on a machine tool. Further, the probe 4 may be mounted onto the distal end of an inspection robot, which may for example comprise a robotic arm having several articulating joints.

As will be understood, the description of the specific embodiment also involves obtaining and processing images to obtain photogrammetrical target points by identifying discontinuities in the pattern projected onto the object. As will be understood, this need not necessarily be the case. For example, the system and method of the invention might not be configured to determine target points for photogrammetrical purposes at all. If it is, then target points can be identified using other known methods. For instance, target points can be identified by markers placed on the object or by projecting a marker onto the object.

Further, although the invention is described as a single probe containing a projector and imaging device, the projector and image sensor could be provided separately (e.g. so that they can be physically manipulated independently of each other). Furthermore, a plurality of imaging devices could be provided.

The invention claimed is:

1. A non-contact method for inspecting an object via phase analysis, comprising in any suitable order:
   i) a projector projecting an optical pattern onto the surface of an object to be inspected;
   ii) at least one imaging device obtaining a set of phase-shifted images of the optical pattern on the surface, wherein
      the projector and the at least one imaging device are in a fixed spatial relationship relative to each other and in which the position of the optical pattern on the object is moved between images in the set of the phase-shifted images by rotating the projector and the at least one imaging device relative to the object about the imaging device's perspective centre.

2. A method as claimed in claim 1, in which the optical pattern as projected by the projector is the same for images in the set of phase-shifted images.

3. A method as claimed in claim 1, further comprising:
   iii) processing the set of phase-shifted images to obtain topographical surface data.

4. A method as claimed in claim 3, wherein processing the set of phase-shifted images comprises analysing the phase of the optical pattern on the surface.

5. A method as claimed in claim 3, wherein step iii) comprises processing at least one of the images in the set of phase-shifted images to compensate for any relative movement between the object and the imaging device.

6. A method as claimed in claim 3, wherein in step iii) corresponding points in the set of phase-shifted images represent different points on the object.

7. A method as claimed in claim 6, wherein step iii) comprises analysing the change in phase of the optical pattern across corresponding points in the set of phase-shifted images.

8. A method as claimed in claim 3, wherein determining the topographical surface data comprises calculating a phase map from the set of phase-shifted images.

9. A method as claimed in claim 3, wherein analysing the set of phase-shifted images comprises determining the gradient of the surface.

10. A method as claimed in claim 9, wherein determining the gradient of the surface comprises calculating a phase shift map from the set of phase-shifted images and obtaining a gradient map based on the phase shift map.

11. A method as claimed in claim 10, further comprising integrating the gradient map to obtain the topographical data.

12. A method as claimed in claim 1, wherein the projector is mounted on a coordinate positioning apparatus.

13. A method as claimed in claim 3, wherein the object is located in a measurement space and step iii) comprises determining the three-dimensional coordinates of the topographical data within the measurement space.

14. A method as claimed in claim 1, wherein the optical pattern is a periodic optical pattern.

15. An apparatus for inspecting an object via phase analysis, the apparatus comprising:
    a projector configured to project an optical pattern onto the surface of an object to be measured, the projector being moveable relative to the object;
    at least one imaging device in a fixed spatial relationship with the projector and configured to obtain a plurality of phase-shifted images of the object on which the optical pattern is projected, wherein
    the projector and the object are configured to be moved relative to each other by rotating the projector and the at least one imaging device relative to the object about the imaging device's perspective centre between obtaining the phase-shifted images to cause a change in phase of the periodic optical pattern on the object.

16. A non-transitory computer-readable storage medium storing a computer program that, when executed by a controller, causes the controller to control at least one projector, imaging device and image analyser to execute a non-contract method for inspecting an object via phase analysis, the program comprising in any suitable order:
    i) instructions for causing a projector to project an optical pattern onto the surface of an object to be inspected;

ii) instructions for causing at least one imaging device to obtain a set of phase-shifted images of the optical pattern on the surface, wherein the projector and at least one imaging device are in a fixed spatial relationship relative to each other and in which the position of the optical pattern on the object is moved between images in the set of the phase-shifted images by rotating the projector and the at least one imaging device relative to the object about the imaging device's perspective centre.

* * * * *